(12) United States Patent
Yamada et al.

(10) Patent No.: US 12,546,708 B2
(45) Date of Patent: Feb. 10, 2026

(54) OPTICAL DEVICE AND SPECTROSCOPIC DEVICE

(71) Applicant: SEIKO EPSON CORPORATION, Tokyo (JP)

(72) Inventors: Kohei Yamada, Shiojiri (JP); Shoichi Takasuna, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 178 days.

(21) Appl. No.: 18/586,650

(22) Filed: Feb. 26, 2024

(65) Prior Publication Data

US 2024/0288362 A1   Aug. 29, 2024

(30) Foreign Application Priority Data

Feb. 27, 2023   (JP) ................................. 2023-028147

(51) Int. Cl.
  *G01N 21/31*    (2006.01)
  *G01B 9/02*    (2022.01)
  (Continued)

(52) U.S. Cl.
  CPC ............... *G01N 21/31* (2013.01); *G01B 9/02* (2013.01); *G01J 3/45* (2013.01); *G01J 3/453* (2013.01);
  (Continued)

(58) Field of Classification Search
  CPC ........ G01N 21/31; G01N 21/01; G01N 21/45; G01N 2201/0636; G01B 9/02;
  (Continued)

(56) References Cited

U.S. PATENT DOCUMENTS

| 2010/0268499 A1* | 10/2010 | Holzapfel | G01B 9/0207 356/454 |
| 2012/0287439 A1* | 11/2012 | Hirao | G01J 3/0208 356/450 |

(Continued)

FOREIGN PATENT DOCUMENTS

| CN | 107167085 A * | 9/2017 | ............. G01B 11/06 |
| DE | 3503007 C2 * | 8/1988 | ......... G01B 9/02056 |

(Continued)

*Primary Examiner* — Michelle M Iacoletti
*Assistant Examiner* — Noah J. Haney
(74) *Attorney, Agent, or Firm* — Harness, Dickey & Pierce, P.L.C.

(57) ABSTRACT

An optical device includes: an incident optical system; an analysis optical system; and a length measurement optical system. The incident optical system includes a laser light source, and an incident light dividing element that divides the laser light. The analysis optical system includes a first light dividing element that divides the first divided light and then mixes the light, a first mirror that adds a first modulation signal to the one first divided light by movement and reflection, a second mirror, and a first light receiving element that receives the first divided light including a sample-derived signal and the first modulation signal. The length measurement optical system includes a second light dividing element that divides the second divided light and then mixes the light, an optical feedback unit that feeds back the one second divided light to the second light dividing element, and a second light receiving element that receives the second divided light including a displacement signal generated by the first mirror.

11 Claims, 29 Drawing Sheets

(51) Int. Cl.
  *G01B 9/02015* (2022.01)
  *G01B 11/04* (2006.01)
  *G01J 3/45* (2006.01)
  *G01J 3/453* (2006.01)
  *G01N 21/01* (2006.01)
  *G01N 21/45* (2006.01)
  *G02B 26/08* (2006.01)

(52) U.S. Cl.
  CPC ............ *G01J 3/4535* (2013.01); *G01N 21/01* (2013.01); *G01N 21/45* (2013.01); *G02B 26/0816* (2013.01); *G01B 9/02027* (2013.01); *G01B 11/043* (2013.01); *G01B 2290/60* (2013.01); *G01B 2290/70* (2013.01); *G01N 2201/0636* (2013.01)

(58) Field of Classification Search
  CPC .............. G01B 9/02027; G01B 11/043; G01B 2290/60; G01B 2290/70; G01J 3/45; G01J 3/453; G01J 3/4535; G02B 26/0816
  USPC .......................... 356/326, 450, 451
  See application file for complete search history.

(56) References Cited

U.S. PATENT DOCUMENTS

| | | | |
|---|---|---|---|
| 2016/0282184 A1* | 9/2016 | Khalil | G01J 3/108 |
| 2020/0124472 A1 | 4/2020 | Suzuki et al. | |
| 2020/0124479 A1 | 4/2020 | Suzuki et al. | |
| 2020/0408596 A1* | 12/2020 | Vuorinen | G01J 3/4535 |
| 2022/0065614 A1 | 3/2022 | Yamada et al. | |
| 2024/0045199 A1* | 2/2024 | Yamada | G02B 27/1026 |
| 2024/0319082 A1* | 9/2024 | Yamada | G01J 3/45 |
| 2024/0319087 A1* | 9/2024 | Hayashi | G01N 21/359 |
| 2024/0393180 A1* | 11/2024 | Yamada | G01B 9/02044 |
| 2025/0102362 A1* | 3/2025 | Hayashi | G01J 3/14 |
| 2025/0198922 A1* | 6/2025 | Chindo | G01J 3/06 |
| 2025/0297946 A1* | 9/2025 | Hayashi | G01N 21/31 |

FOREIGN PATENT DOCUMENTS

| | | | | |
|---|---|---|---|---|
| DE | 4100773 C2 * | 9/1999 | ......... | G01B 9/02027 |
| JP | 2007-285898 A | 11/2007 | | |
| JP | 6496463 B1 | 4/2019 | | |
| JP | 2020-129116 A | 8/2020 | | |
| JP | 2022-038156 A | 3/2022 | | |
| WO | WO-2009135447 A2 * | 11/2009 | ......... | G01B 9/02027 |
| WO | WO-2024155636 A1 * | 7/2024 | ............ | G01J 3/4535 |

* cited by examiner

OPTICAL DEVICE AND SPECTROSCOPIC DEVICE

The present application is based on, and claims priority from JP Application Serial Number 2023-028147, filed Feb. 27, 2023, the disclosure of which is hereby incorporated by reference herein in its entirety.

BACKGROUND

1. Technical Field

The present disclosure relates to an optical device and a spectroscopic device.

2. Related Art

JP-A-2020-129116 discloses an optical device used for spectroscopy for obtaining spectrum information of light emitted or absorbed by a sample and analyzing components in the sample based on the spectrum information. The optical device includes a mirror unit, a beam splitter unit, a first photodetector, a second light source, and a second photodetector. The mirror unit includes a movable mirror that moves in a predetermined direction and a fixed mirror whose position is fixed. In such an optical device, an interference optical system into which measurement light and laser light are incident is implemented by the beam splitter unit, the movable mirror, and the fixed mirror.

The measurement light incident from the first light source through a measurement target is divided in the beam splitter unit. A part of the divided measurement light is reflected by the movable mirror and returns to the beam splitter unit. A remaining part of the divided measurement light is reflected by the fixed mirror and returns to the beam splitter unit. The part and the remaining part of the measurement light returned to the beam splitter unit are detected by the first photodetector as interference light.

Further, the laser light emitted from the second light source is divided by the beam splitter unit. A part of the divided laser light is reflected by the movable mirror and returns to the beam splitter unit. A remaining part of the divided laser light is reflected by the fixed mirror and returns to the beam splitter unit. The part and the remaining part of the laser light returned to the beam splitter unit are detected by the second photodetector as interference light.

In such an optical device, a position of the movable mirror can be measured based on a detection result of the interference light of the laser light. Further, based on a measurement result of the position of the movable mirror and the detection result of the interference light of the measurement light, the spectroscopy of the measurement target is possible. Specifically, a waveform called an interferogram obtained by determining an intensity of the measurement light at each position of the movable mirror. By performing Fourier transform on the interferogram, spectrum information about the measurement target can be determined. Therefore, the optical device described in JP-A-2020-129116 is used for a Fourier transform infrared spectrometer (FTIR).

JP-A-2020-129116 is an example of the related art.

SUMMARY

When implementing a spectrometer in the optical device described in JP-A-2020-129116, it is necessary to use the first light source that emits the measurement light (analysis light) and the second light source that emits the laser light (length measurement light). Therefore, it is necessary to secure a space and power necessary for the two light sources, and a structure thereof is also complicated. As a result, the spectrometer increases in size, power consumption, and cost.

An optical device according to an application example of the present disclosure includes:
  an incident optical system;
  an analysis optical system; and
  a length measurement optical system, in which
  the incident optical system includes
    a laser light source that emits laser light, and
    an incident light dividing element that divides the laser light into first divided light and second divided light,
  the analysis optical system includes
    a first light dividing element that divides the first divided light into one and the other and then mixes the one first divided light and the other first divided light,
    a first mirror that adds a first modulation signal to the one first divided light by moving in an incident direction of the one first divided light and reflecting the one first divided light,
    a second mirror that reflects the other first divided light, and
    a first light receiving element that receives the first divided light including the first modulation signal and a sample-derived signal generated by a sample, and outputs a first light receiving signal, and
  the length measurement optical system includes
    a second light dividing element that divides the second divided light into one and the other and then mixes the one second divided light and the other second divided light,
    an optical feedback unit that feeds back the one second divided light emitted from the second light dividing element to the second light dividing element, and
    a second light receiving element that receives the second divided light including a displacement signal generated by reflection of the other second divided light by the first mirror and outputs a second light receiving signal.

A spectroscopic device according to an application example of the present disclosure includes:
  the optical device according to the application example of the present disclosure;
  a signal generation unit configured to output a reference signal;
  a moving mirror position calculation unit configured to generate, based on the reference signal, a moving mirror position signal indicating a position of the first mirror by performing calculation on the second light receiving signal;
  a light intensity calculation unit configured to generate, based on the first light receiving signal and the moving mirror position signal, a waveform indicating an intensity of the first light receiving signal at each position of the first mirror; and
  a Fourier transform unit configured to perform Fourier transform on the waveform to obtain spectrum information.

DESCRIPTION OF EMBODIMENTS

Hereinafter, an optical device and a spectroscopic device according to the present disclosure will be described in detail based on embodiments shown in the accompanying drawings.

1. First Embodiment

First, an optical device and a spectroscopic device according to a first embodiment will be described.

Figure 1:
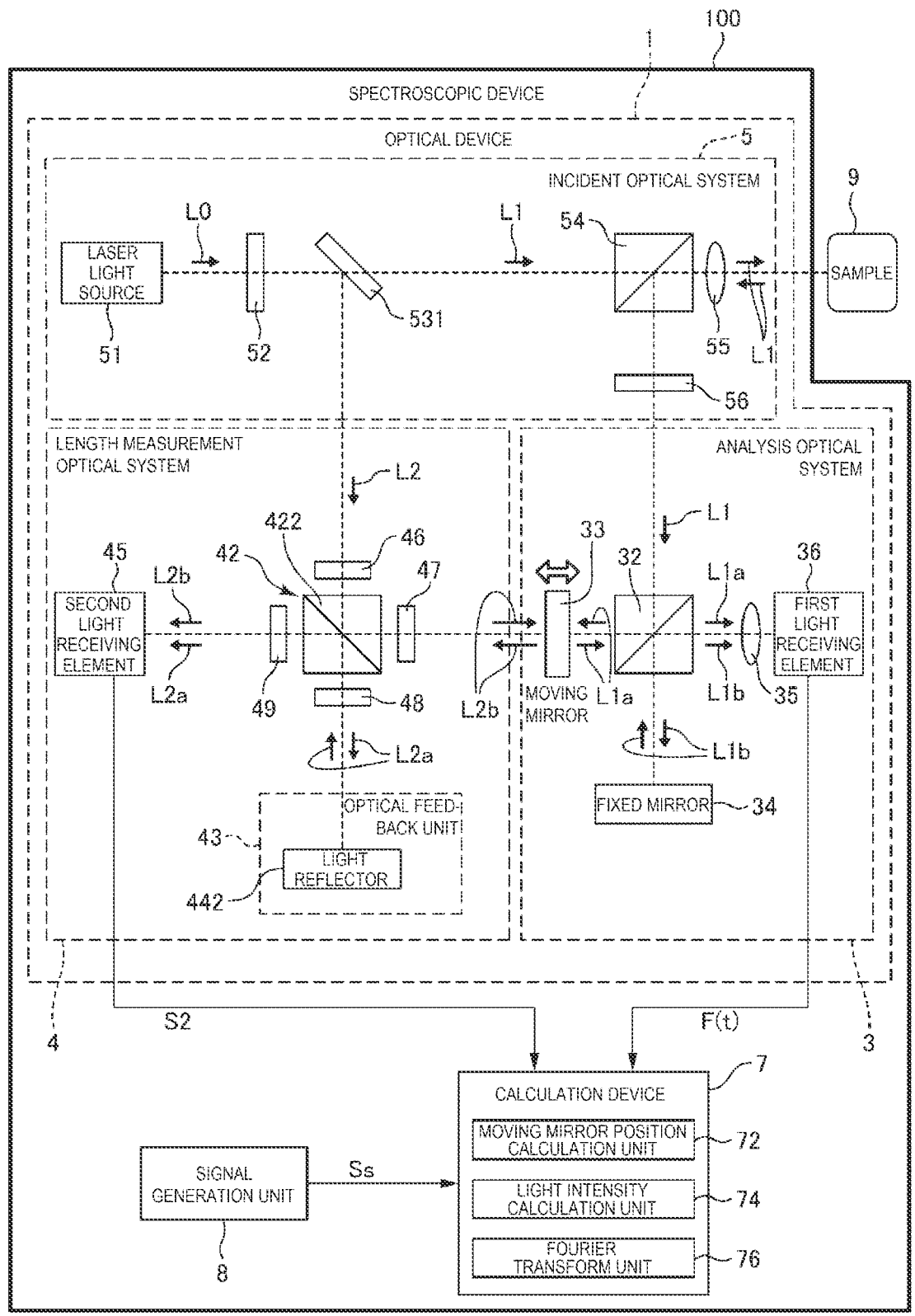
FIG. 1 is a schematic configuration diagram showing a spectroscopic device according to a first embodiment.

FIG. 1 is a schematic configuration diagram showing a spectroscopic device 100 according to the first embodiment.

In the spectroscopic device 100 shown in FIG. 1, an interferogram is obtained by irradiating a sample 9, which is an object to be detected, with laser light, causing the light emitted from the sample 9 to enter a Michelson interference optical system, and detecting a change in an intensity of interference light obtained by the Michelson interference optical system. By performing Fourier transform on the obtained interferogram, a spectral pattern including information derived from the sample 9 is obtained. By selecting a wavelength of the laser light, the spectroscopic device 100 shown in FIG. 1 can be applied to, for example, laser excitation spectroscopy such as Fourier-type Raman spectroscopy and Fourier-type fluorescence spectroscopy for the sample 9.

The spectroscopic device 100 includes an optical device 1, a signal generation unit 8, and a calculation device 7.

As shown in FIG. 1, the optical device 1 includes an incident optical system 5, an analysis optical system 3, and a length measurement optical system 4.

The incident optical system 5 divides emitted light L0 (laser light) emitted from a laser light source 51 into two of analysis light L1 (first divided light) and length measurement light L2 (second divided light). The incident optical system 5 shown in FIG. 1 causes the analysis light L1 to enter the sample 9, and causes the analysis light L1 emitted from the sample 9 to enter the analysis optical system 3. In addition, the incident optical system 5 causes the length measurement light L2 to enter the length measurement optical system 4.

In the analysis optical system 3, the analysis light L1 is divided and synthesized while changing an optical path length of the analysis light L1 so that a sample-derived signal derived from the sample 9 can be extracted from the analysis light L1, thereby generating interference.

The length measurement optical system 4 measures a change in the optical path length of the analysis light L1 using the length measurement light L2.

The signal generation unit 8 has a function of outputting a reference signal Ss toward the calculation device 7. The calculation device 7 has a function of determining a waveform indicating an intensity of the interference light with respect to the optical path length, that is, the interferogram described above, based on a signal indicating the intensity of the interference light output from the analysis optical system 3 and a signal indicating the change in the optical path length output from the length measurement optical system 4. The calculation device 7 has a function of performing the Fourier transform on the interferogram to obtain a spectral pattern including information derived from the sample 9.

1.1. Optical Device

First, the optical device 1 according to the first embodiment will be described.

As described above, the optical device 1 includes the incident optical system 5, the analysis optical system 3, and the length measurement optical system 4.

1.1.1. Incident Optical System

The incident optical system 5 includes the laser light source 51, a bandpass filter 52, a beam splitter 531 (incident light dividing element), a beam splitter 54, a condensing lens 55, and a neutral density filter 56. In the incident optical system 5, a part of the optical elements described above may be omitted, optical elements other than those described above may be provided, or the above-described optical elements may be replaced by other optical elements having equivalent functions.

The laser light source 51 is appropriately selected depending on a purpose such as Raman spectroscopy or fluorescence spectroscopy, and a light source that emits light with a narrow spectral line width is preferably used. Examples of the laser light source 51 include gas lasers such as a He—Ne laser and an Ar laser, semiconductor laser elements such as a distributed feedback-laser diode (DFB-LD), a fiber bragg grating-laser diode (FBG-LD), a vertical cavity surface emitting laser (VCSEL) and a Fabry-Perot laser diode (FP-LD), and crystal lasers such as yttrium aluminum garnet (YAG).

The laser light source 51 is particularly preferably a semiconductor laser element. Accordingly, it is possible to reduce a size and a weight of the optical device 1 and the spectroscopic device 100.

The bandpass filter 52 transmits the emitted light L0 (laser light) emitted from the laser light source 51 while cutting off light of an extra wavelength. The emitted light L0 transmitted through the bandpass filter 52 is divided by the beam splitter 531 into two kinds of laser light, that is, the analysis light L1 (first divided light) and the length measurement light L2 (second divided light). For example, a non-polarizing beam splitter is used as the beam splitter 531, and a polarizing beam splitter may also be used. In this case, a necessary wavelength plate may be appropriately added.

The analysis light L1 passes through the beam splitter 54, is condensed by the condensing lens 55, and irradiates the sample 9. The analysis light L1 emitted from the sample 9 includes a sample-derived signal generated by an action between the analysis light L1 and the sample 9. The analysis light L1 emitted from the sample 9 passes through the condensing lens 55, is reflected by the beam splitter 54, and passes through the neutral density filter 56. At this time, the sample-derived signal such as Raman scattered light or fluorescence is selectively transmitted. That is, when a wavelength of the analysis light L1 emitted to the sample 9 is a "first wavelength", the neutral density filter 56 selectively attenuates light of the first wavelength. Accordingly, an S/N ratio (signal-to-noise ratio) of the sample-derived signal can be increased, and spectroscopy can be performed with higher accuracy. Examples of the neutral density filter 56 include a notch filter and a long pass filter having an optical density (OD value) of 6.0 or more. The analysis light L1 passing through the neutral density filter 56 is incident on the analysis optical system 3.

For example, a non-polarizing beam splitter is used as the beam splitter 54, and a polarizing beam splitter may also be used. In this case, a necessary wavelength plate may be appropriately added.

The length measurement light L2 is reflected by the beam splitter 531 and enters the length measurement optical system 4.

1.1.2. Analysis Optical System

The analysis optical system 3 is a Michelson interference optical system, and includes a beam splitter 32 (first light dividing element), a moving mirror 33, a fixed mirror 34, a condensing lens 35, and a first light receiving element 36. In the analysis optical system 3, a part of the optical elements described above may be omitted, optical elements other than those described above may be provided, or the above-described optical elements may be replaced by other optical elements having equivalent functions.

The beam splitter 32 is a non-polarizing beam splitter that divides the analysis light L1 into two of analysis light L1a and L1b. Specifically, the beam splitter 32 has a function of dividing the analysis light L1 into two by reflecting a part of the analysis light L1 toward the moving mirror 33 as the analysis light L1a and transmitting the other part of the analysis light L1 toward the fixed mirror 34 as the analysis light L1b.

Examples of types of the beam splitter 32 include a plate-type element and a stacked-type element in addition to a prism-type element (cube-type element) shown in FIG. 1. When the plate-type beam splitter 32 is used, wavelength dispersion occurs between the analysis light L1a and the analysis light L1b. Therefore, if necessary, a wavelength dispersion compensator may be disposed between the beam splitter 32 and the fixed mirror 34. The wavelength dispersion compensator is an optical element that compensates for wavelength dispersion due to an optical path length difference between glass materials. In the embodiment, since a prism-type element is used as the beam splitter 32, the wavelength dispersion compensator is unnecessary. The prism-type element is an element in which an optical thin film is sandwiched between prisms. In addition, the stacked-type element is an element in which an optical thin film is sandwiched between two transparent flat plates. Similarly to the prism-type element, the stacked-type element can also eliminate the need for the wavelength dispersion compensator. In addition, in the prism-type element and the stacked-type element, long-term reliability of the beam splitter 32 can be enhanced without exposing the optical thin film.

In addition, the beam splitter 32 transmits the analysis light L1a reflected by the moving mirror 33 toward the first light receiving element 36, and reflects the analysis light Lib reflected by the fixed mirror 34 toward the first light receiving element 36. Therefore, the beam splitter 32 has a function of mixing the divided analysis light L1a and L1b.

The moving mirror 33 is a mirror that moves in an incident direction of the analysis light L1a toward the beam splitter 32 and reflects the analysis light L1a. The analysis light L1a reflected by the moving mirror 33 includes a displacement signal corresponding to a position of the moving mirror 33. Therefore, the moving mirror 33 adds a first modulation signal to the analysis light L1a.

A moving mechanism (not shown) for moving the moving mirror 33 is not particularly limited, and includes, for example, a uniaxial linear stage, a piezo drive device, a microactuator using a micro electro mechanical systems (MEMS) technique. Among these, the uniaxial linear stage can implement good translational performance in moving the moving mirror 33 by being provided with, for example, a voice coil motor (VCM) or a ball screw drive unit and a linear guide mechanism.

The fixed mirror 34 is a mirror whose position is fixed to the beam splitter 32 and reflects the analysis light L1b. The analysis light L1b reflected by the fixed mirror 34 is mixed with the analysis light L1a by the beam splitter 32, and is received by the first light receiving element 36 as the interference light. In the analysis optical system 3, an optical path difference occurs between an optical path of the analysis light L1a and an optical path of the analysis light L1b according to the position of the moving mirror 33. Therefore, an interference state of the interference light changes according to the position of the moving mirror 33.

The moving mirror 33 and the fixed mirror 34 may each be a flat mirror or a corner cube mirror. A metal coat using a metal such as Al, Au, or Ag, a dielectric multilayer film, or the like may be formed at a reflective surface of each mirror. Regarding the moving mirror 33, "moving in the incident direction of the analysis light" includes moving in a direction including a component of the analysis light in the incident direction. Therefore, the moving mirror 33 may move in a direction obliquely inclined with respect to the incident direction (non-parallel direction). In this case, the calculation device 7 only needs to have a function of removing the influence of the moving mirror 33 obliquely inclined with respect to the incident direction of the analysis light. Further, the fixed mirror 34 may also move. In this case, the calculation device 7 only needs to have a function of removing the influence of the movement of the fixed mirror 34.

The condensing lens 35 condenses the interference light, that is, the mixed analysis light L1a and L1b, onto the first light receiving element 36.

The first light receiving element 36 receives the interference light and obtains an intensity thereof. A signal indicating a temporal change in intensity is output as a first light receiving signal F(t). The first light receiving signal F(t) is a signal including the sample-derived signal generated by an interaction between the analysis light L1 and the sample 9, and the above-described first modulation signal. Examples of the sample-derived signal include light absorption at a specific wavelength by the sample 9 when the analysis light L1 acts on the sample 9. The first modulation signal is a change in phase added to the analysis light L1a as the moving mirror 33 moves.

Examples of the first light receiving element 36 include a photodiode and a phototransistor. Among these, examples of the photodiode include an InGaAs-based photodiode, a Si-based photodiode, and an avalanche type photodiode.

1.1.3. Length Measurement Optical System

The length measurement optical system 4 is a Michelson interference optical system, and includes a second light dividing element 42, an optical feedback unit 43, and a second light receiving element 45. In the length measurement optical system 4, a part of the optical elements described above may be omitted, optical elements other than those described above may be provided, or the above-described optical elements may be replaced by other optical elements having equivalent functions.

The second light dividing element 42 includes a beam splitter 422, a ½ wavelength plate 46, a ¼ wavelength plate 47, a ¼ wavelength plate 48, and an analyzer 49.

The beam splitter 422 is a polarizing beam splitter that transmits P-polarized light and reflects S-polarized light. The ½ wavelength plate 46 is disposed with a transmission axis thereof rotated with respect to a polarization axis of the length measurement light L2. Accordingly, the length measurement light L2 passes through the ½ wavelength plate 46, becomes linearly polarized light including the P-polarized light and the S-polarized light, and is divided into two of the P-polarized light and the S-polarized light by the beam splitter 422. A length measurement light L2a, which is the P-polarized light, is converted into circularly polarized light by the ¼ wavelength plate 48 and enters the optical feedback unit 43. The optical feedback unit 43 returns the light to the beam splitter 422 by reflecting the length measurement light L2a. At this time, the length measurement light L2a is converted into the S-polarized light by the ¼ wavelength plate 48. Further, the length measurement light L2b, which is the S-polarized light, is converted into circularly polarized light by the ¼ wavelength plate 47, and enters the moving mirror 33. The moving mirror 33 reflects the length measurement light L2b. Accordingly, the moving mirror 33 adds a displacement signal corresponding to the position of the moving mirror 33 to the length measurement light L2b. The length measurement light L2b reflected by the moving mirror 33 returns to the beam splitter 422. At this time, the length measurement light L2b is converted into the P-polarized light by the ¼ wavelength plate 47. The length measurement optical system 4 shown in FIG. 1 is implemented such that the length measurement light L2b is incident on a surface different from a surface of the moving mirror 33 on which the analysis light L1a in the above-described analysis optical system 3 is incident.

In addition, the beam splitter 422 reflects the length measurement light L2a fed back from the optical feedback unit 43 toward the second light receiving element 45, and transmits the length measurement light L2b reflected by the moving mirror 33 toward the second light receiving element 45. Therefore, the beam splitter 422 has a function of mixing the divided length measurement light L2a and L2b. The mixed length measurement light L2a and L2b is transmitted through the analyzer 49 and enters the second light receiving element 45.

A non-polarizing beam splitter may be used as the beam splitter 422 instead of the polarizing beam splitter. In this case, since the wavelength plate or the like is unnecessary, the size of the optical device 1 can be reduced by reducing the number of components.

The optical feedback unit 43 includes a light reflector 442, transmits the light transmitted through the beam splitter 422, and returns the light to the beam splitter 422. The light reflector 442 is, for example, a mirror. Accordingly, the configuration of the optical feedback unit 43 can be simplified, and the size of the optical device 1 can be reduced.

The second light receiving element 45 receives the mixed length measurement light L2a and L2b as the interference light, and obtains an intensity thereof. A signal indicating a temporal change in intensity is output as a second light receiving signal S2. The second light receiving signal S2 is a signal including a displacement signal of the moving mirror 33. The displacement signal is a change in phase added to the length measurement light L2b according to the position of the moving mirror 33.

Examples of the second light receiving element 45 include a photodiode and a phototransistor.

Although the incident optical system 5, the analysis optical system 3, and the length measurement optical system 4 are described above, it is preferable that anti-reflection treatment is applied to optical elements that require light to enter among the optical elements provided therein. Accordingly, S/N ratios of the first light receiving signal F(t) and the second light receiving signal S2 can be enhanced.

In both the analysis optical system 3 and the length measurement optical system 4 described above, the emitted light L0 emitted from one laser light source 51 provided in the incident optical system 5 is used for optical interference. Therefore, it is not necessary to use two light sources, and space saving, low power consumption, and structure simplification of the optical system can be achieved. Therefore, according to the optical device 1 described above, it is possible to implement the spectroscopic device 100 which is small in size and consumes little power and which is low in cost.

1.2. Signal Generation Unit

Figure 2:
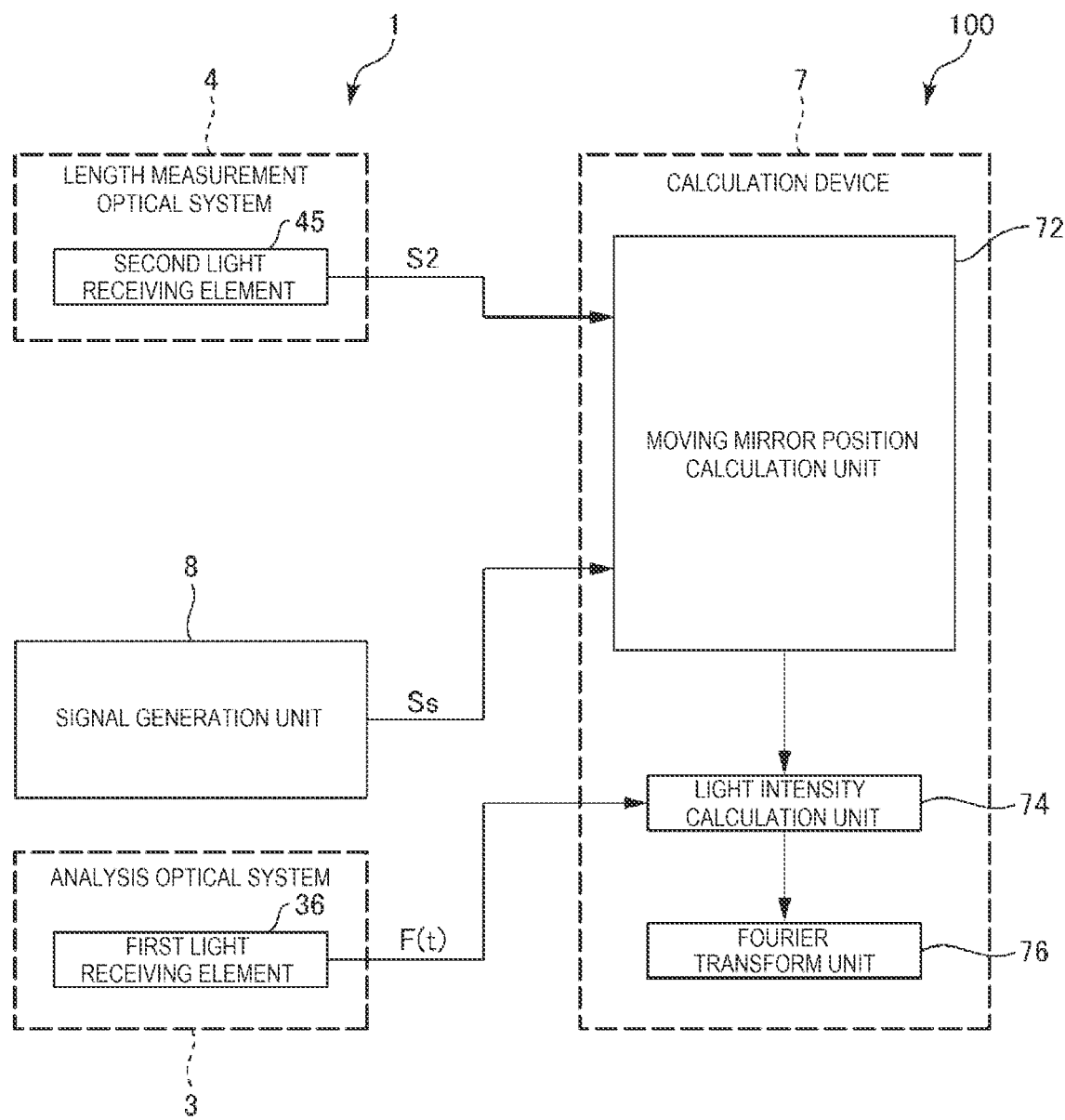
FIG. 2 is a schematic diagram showing main parts of an analysis optical system, a length measurement optical system, a signal generation unit, and a calculation device in FIG. 1.

FIG. 2 is a schematic diagram showing main parts of the analysis optical system 3, the length measurement optical system 4, the signal generation unit 8, and the calculation device 7 in FIG. 1.

The signal generation unit 8 shown in FIG. 2 generates a periodic signal and outputs the periodic signal s the reference signal Ss. Examples of the signal generation unit 8 include a function generator, a signal generator, and a numerically controlled signal generator. The calculation device 7 generates, based on the reference signal Ss, a moving mirror position signal X(t) indicating the position of the moving mirror 33.

1.3. Calculation Device

The calculation device 7 shown in FIGS. 1 and 2 includes a moving mirror position calculation unit 72, a light intensity calculation unit 74, and a Fourier transform unit 76. Functions exhibited by these functional units are implemented by hardware including, for example, a processor, a memory, an external interface, an input unit, and a display unit. Specifically, the functions are implemented by a processor reading and executing a program stored in memory. These components can communicate with each other by an external bus.

Examples of the processor include a central processing unit (CPU) and a digital signal processor (DSP). Instead of a method in which the processor executes software, a method in which a field-programmable gate array (FPGA), an application specific integrated circuit (ASIC), or the like implements the above-described functions may be adopted.

Examples of the memory include a hard disk drive (HDD), a solid state drive (SSD), an electrically erasable programmable read-only memory (EEPROM), a read-only memory (ROM), and a random access memory (RAM).

Examples of the external interface include a digital input and output port such as a universal serial bus (USB) and an Ethernet (registered trademark) port.

Examples of the input unit include various input devices such as a keyboard, a mouse, a touch panel, and a touch pad. Examples of the display unit include a liquid crystal display panel and an organic electro luminescence (EL) display panel. The input unit and the display unit may be provided as necessary, and may be omitted.

1.3.1. Moving Mirror Position Calculation Unit

The moving mirror position calculation unit 72 performs, based on the reference signal Ss output from the signal generation unit 8, calculation on the second light receiving signal S2 including the displacement signal of the moving mirror 33. Accordingly, the moving mirror position signal X(t) indicating the position of the moving mirror 33 is generated. When the moving mirror 33 moves, the intensity of the interference light in the length measurement optical system 4 changes accordingly. In this case, the second light receiving signal S2 is, for example, a signal whose amplitude changes at a predetermined cycle according to an interference condition. The displacement of the moving mirror 33 can be calculated based on the change in the amplitude of the second light receiving signal S2, and the moving mirror position signal X(t) is determined.

1.3.2. Light Intensity Calculation Unit

The light intensity calculation unit 74 generates, based on the first light receiving signal F(t) and the moving mirror position signal X(t), a waveform (interferogram F(x)) representing the intensity of the interference light with respect to the position of the moving mirror 33.

As described above, the first light receiving signal F(t) includes the sample-derived signal and the first modulation signal. The light intensity calculation unit 74 extracts an intensity of the first light receiving signal F(t) based on the moving mirror position signal X(t). Further, the light intensity calculation unit 74 generates the interferogram F(x) based on the position of the moving mirror 33 and the intensity of the first light receiving signal F(t) determined from the moving mirror position signal X(t). The interferogram F(x) is expressed by a function of an optical path difference between reflected light from the moving mirror 33 and reflected light from the fixed mirror 34 in the analysis optical system 3 and the intensity of the interference light received by the first light receiving element 36 (intensity of the first light receiving signal F(t)).

Figure 3:
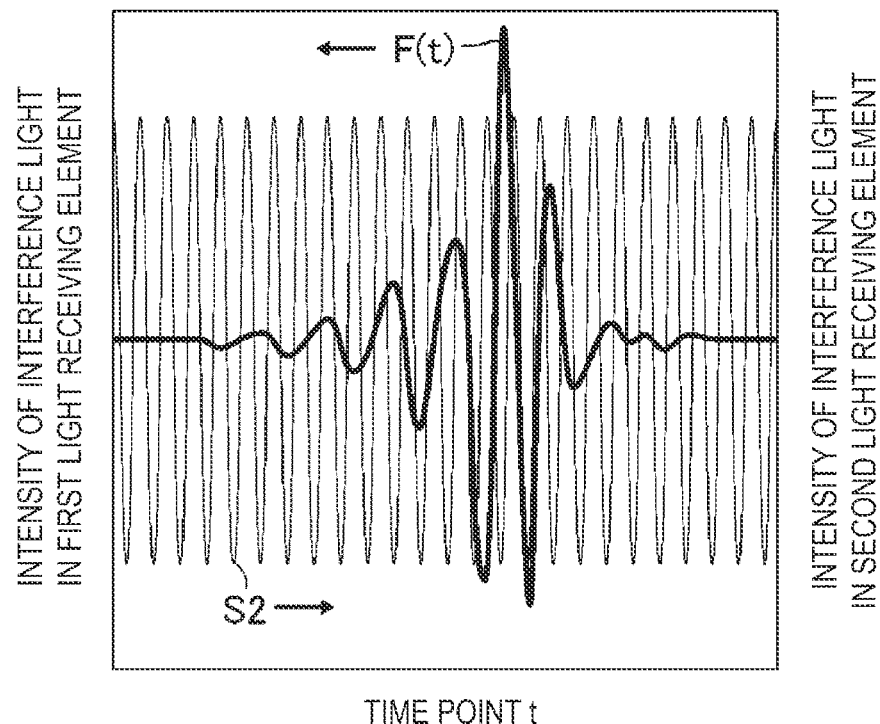
FIG. 3 is a diagram showing an example of a first light receiving signal F(t) and a second light receiving signal S2 obtained by the optical device shown in FIG. 1.

FIG. 3 is a diagram showing an example of the first light receiving signal F(t) and the second light receiving signal S2 obtained by the optical device 1 shown in FIG. 1. A horizontal axis in FIG. 3 indicates a time point, and a vertical axis indicates an intensity of the interference light incident on the first light receiving element 36 and an intensity of the interference light incident on the second light receiving element 45.

Figure 4:
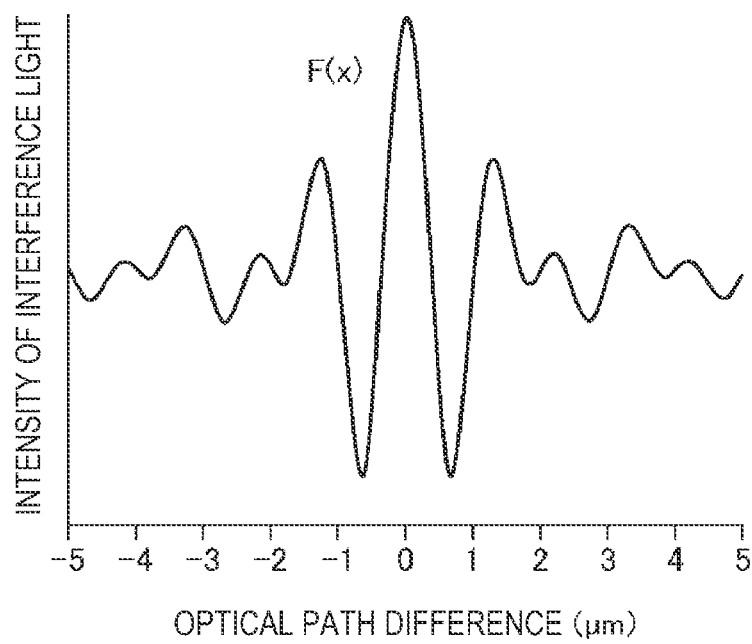
FIG. 4 is a diagram showing an example of an interferogram F(x).

FIG. 4 is a diagram showing an example of the interferogram F(x). A horizontal axis of FIG. 4 indicates the optical path difference in the analysis optical system 3, and a vertical axis indicates the intensity of the interference light. The optical path difference in the analysis optical system 3 is a difference between an optical path length between the beam splitter 32 and the moving mirror 33 and an optical path length between the beam splitter 32 and the fixed mirror 34. In FIG. 4, a zero optical path difference is taken as an origin of horizontal axis.

Figure 5:
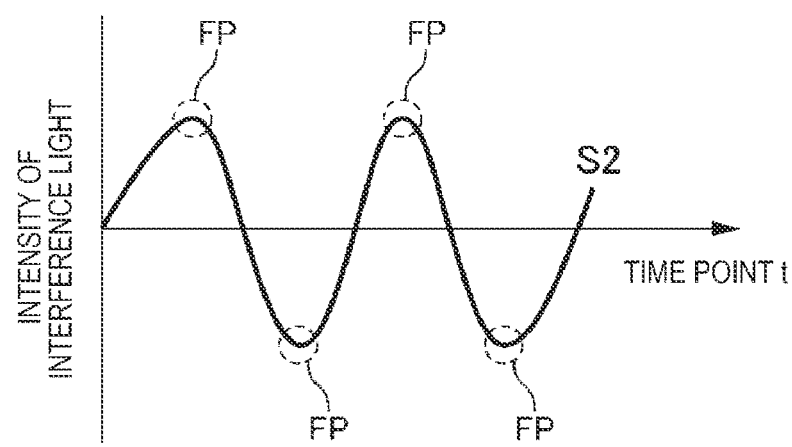
FIG. 5 is a partially enlarged view of the second light receiving signal S2 shown in FIG. 3.

FIG. 5 is a partially enlarged view of the second light receiving signal S2 shown in FIG. 3. The second light receiving signal S2 shown in FIG. 5 is a signal that vibrates at a predetermined cycle, and a point at which the amplitude is maximum is a feature point FP. The light intensity calculation unit 74 can associate the position of the moving mirror 33 with the intensity of the first light receiving signal F(t) by extracting the intensity of the first light receiving signal F(t) at the time points of the feature points FP. Accordingly, digital data of the interferogram F(x) can be obtained.

1.3.3. Fourier Transform Unit

The Fourier transform unit 76 performs the Fourier transform on the interferogram F(x). Accordingly, a spectral pattern unique to the sample 9 is obtained.

The obtained spectral pattern reflects a sample-derived signal generated by the analysis light L1 acting on the sample 9. Therefore, according to the spectroscopic device 100 including the optical device 1 as described above, characteristics of the sample 9, for example, a material, a structure, and a component, can be analyzed based on the spectral pattern.

2. First Modification of First Embodiment

Next, an optical device and a spectroscopic device according to a first modification of the first embodiment will be described.

Figure 6:
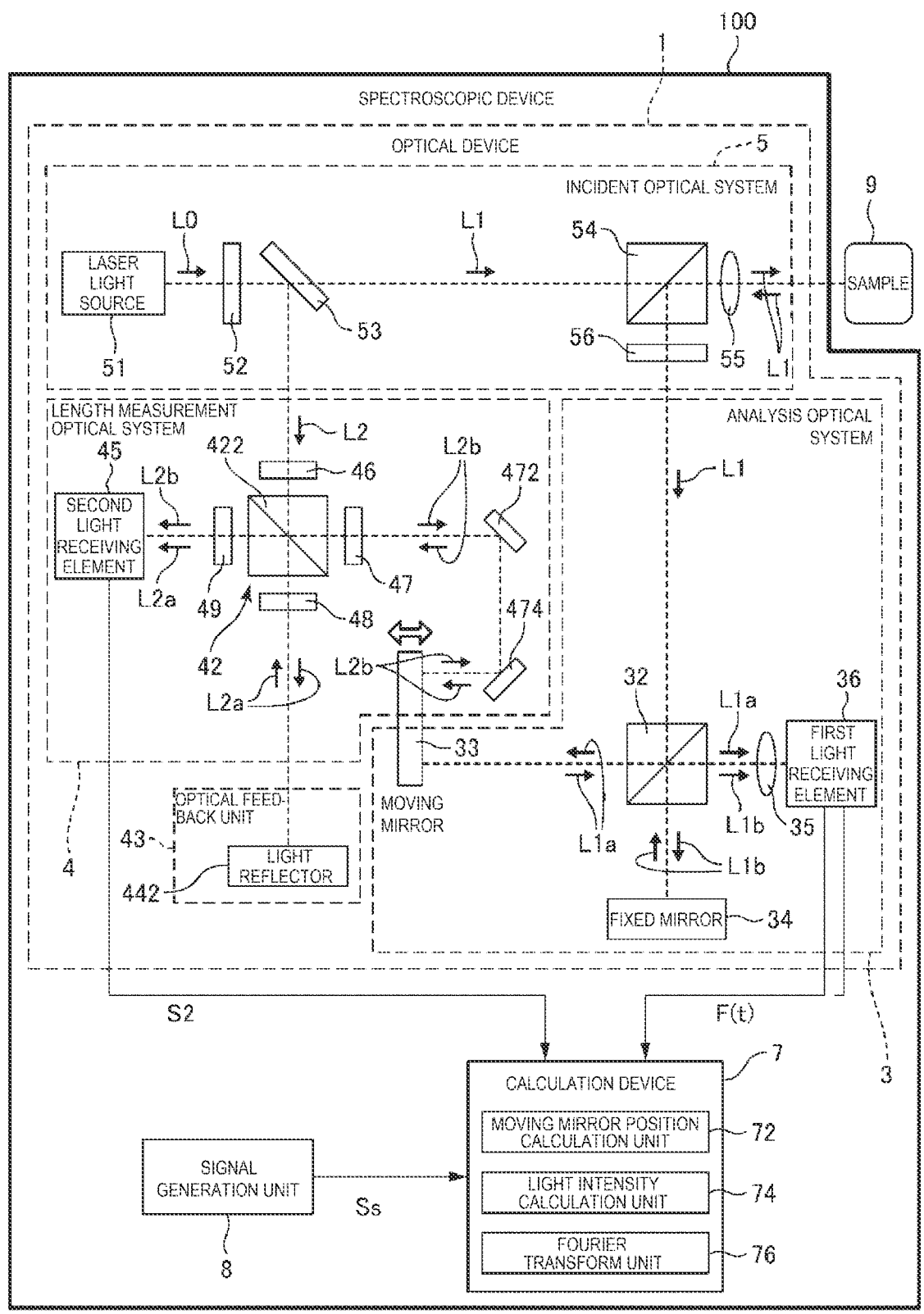
FIG. 6 is a schematic configuration diagram showing a spectroscopic device according to a first modification of the first embodiment.

FIG. 6 is a schematic configuration diagram showing the spectroscopic device 100 according to the first modification of the first embodiment.

The spectroscopic device 100 shown in FIG. 6 is the same as the spectroscopic device 100 shown in FIG. 1 except that a configuration of the length measurement optical system 4 of the optical device 1 is different.

The length measurement optical system 4 shown in FIG. 6 includes mirrors 472 and 474 in addition to the configuration in the first embodiment. The mirrors 472 and 474 are provided between the ¼ wavelength plate 47 and the moving mirror 33. Further, the mirrors 472 and 474 change an extending direction of an optical path connecting the ¼ wavelength plate 47 and the moving mirror 33. Accordingly, the length measurement optical system 4 shown in FIG. 6 is implemented such that the length measurement light L2b is incident on a surface same as a surface of the moving mirror 33 on which the analysis light L1a in the above-described analysis optical system 3 is incident. Accordingly, the analysis light and the length measurement light L2b are incident on physically close positions. As a result, it is possible to further enhance matching between position information of the moving mirror 33 included in the first light receiving signal F(t) and position information of the moving mirror 33 included in the moving mirror position signal X(t). Accordingly, accuracy of a wavenumber axis can be further enhanced in the finally obtained spectral pattern. In this case, a light reflecting function may be provided only on one side of the moving mirror 33, so that the configuration of the moving mirror 33 can be simplified.

In such a configuration, a physical distance from the beam splitter 422 to the light reflector 442 and a physical distance from the beam splitter 422 to the moving mirror 33 are easily matched. Accordingly, the position of the moving mirror 33 can be determined with higher accuracy.

In the first modification n described above, effects same as those of the first embodiment can also be obtained.

3. Second Modification of First Embodiment

Next, an optical device and a spectroscopic device according to a second modification of the first embodiment will be described.

Figure 7:
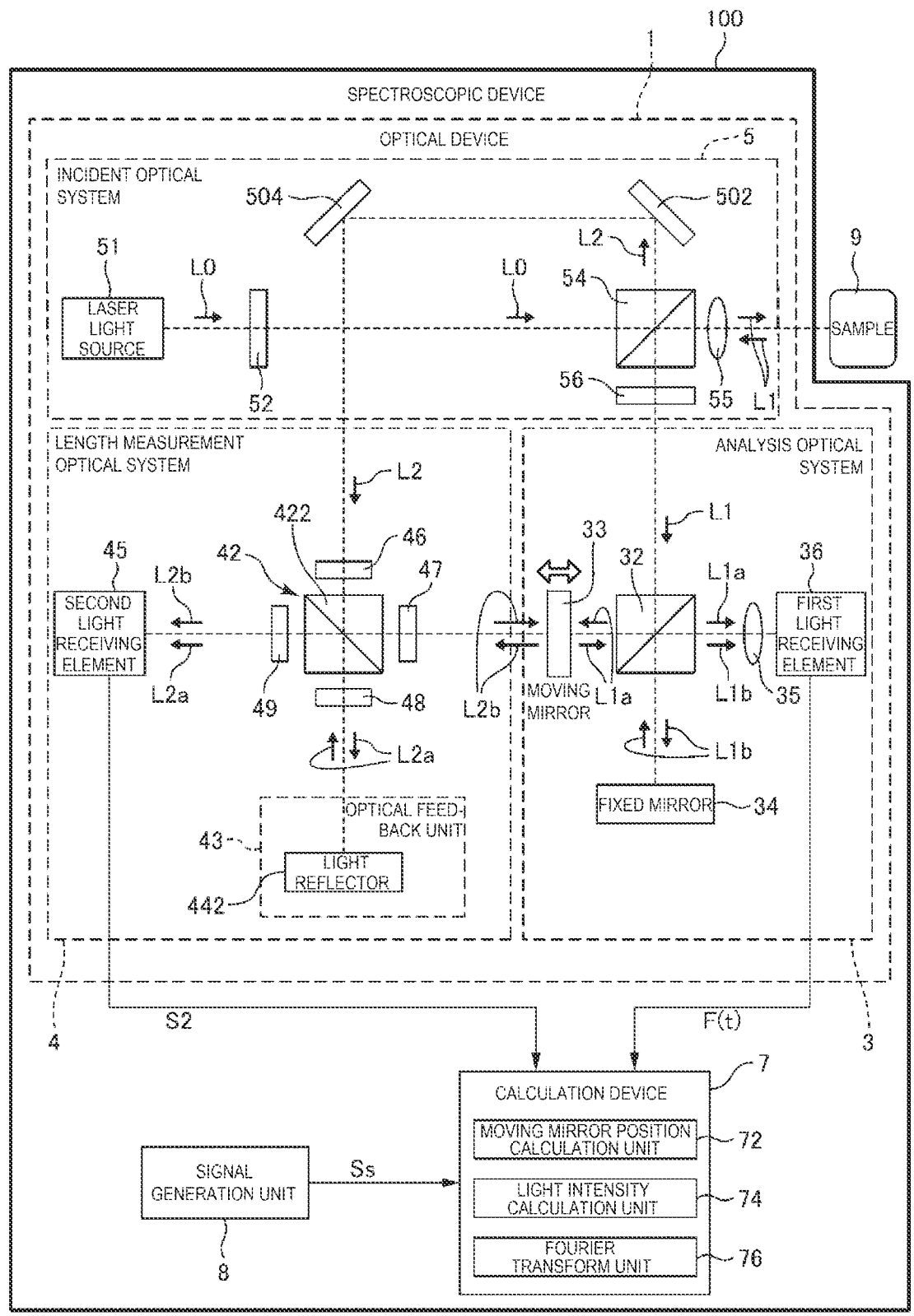
FIG. 7 is a schematic configuration diagram showing a spectroscopic device according to a second modification of the first embodiment.

FIG. 7 is a schematic configuration diagram showing the spectroscopic device 100 according to the second modification of the first embodiment.

The spectroscopic device 100 shown in FIG. 7 is the same as the spectroscopic device 100 shown in FIG. 1 except that a configuration of the incident optical system 5 of the optical device 1 is different.

The incident optical system 5 shown in FIG. 7 includes mirrors 502 and 504 in addition to the configuration in the first embodiment, and the beam splitter 531 is omitted. The mirrors 502 and 504 are provided between the beam splitter 54 and the length measurement optical system 4. In addition, the beam splitter 54 divides the emitted light L0 into two kinds of laser light, that is, the analysis light L1 (first divided light) and the length measurement light L2 (second divided light). The length measurement light L2 is incident on the length measurement optical system 4 through the mirrors 502 and 504. According to such a configuration, since the beam splitter 531 can be omitted, the number of components of the incident optical system 5 can be reduced, and the size and cost can be reduced.

4. Second Embodiment

Next, an optical device and a spectroscopic device according to a second embodiment will be described.

Figure 8:
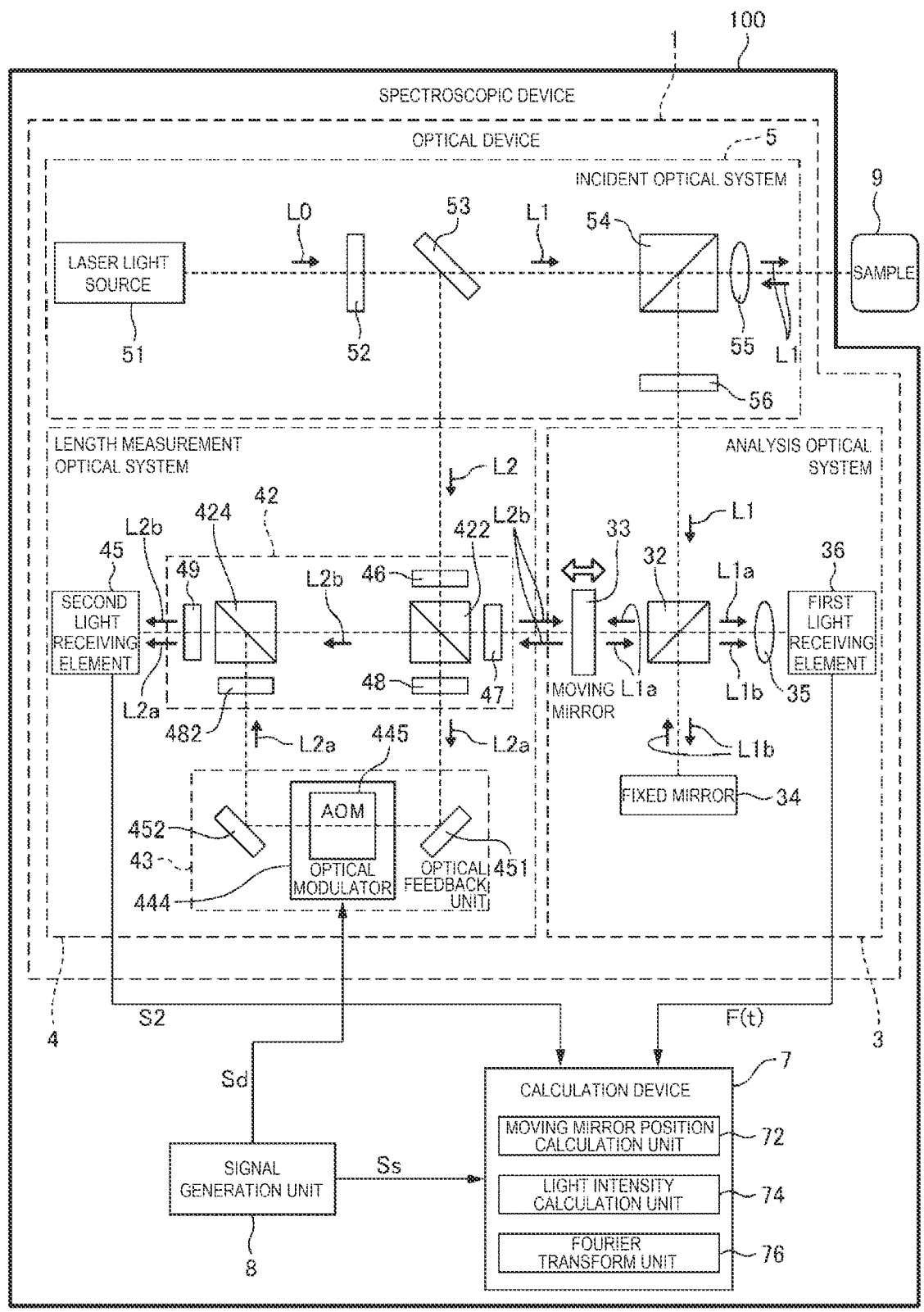
FIG. 8 is a schematic configuration diagram showing a spectroscopic device according to a second embodiment.
Figure 9:
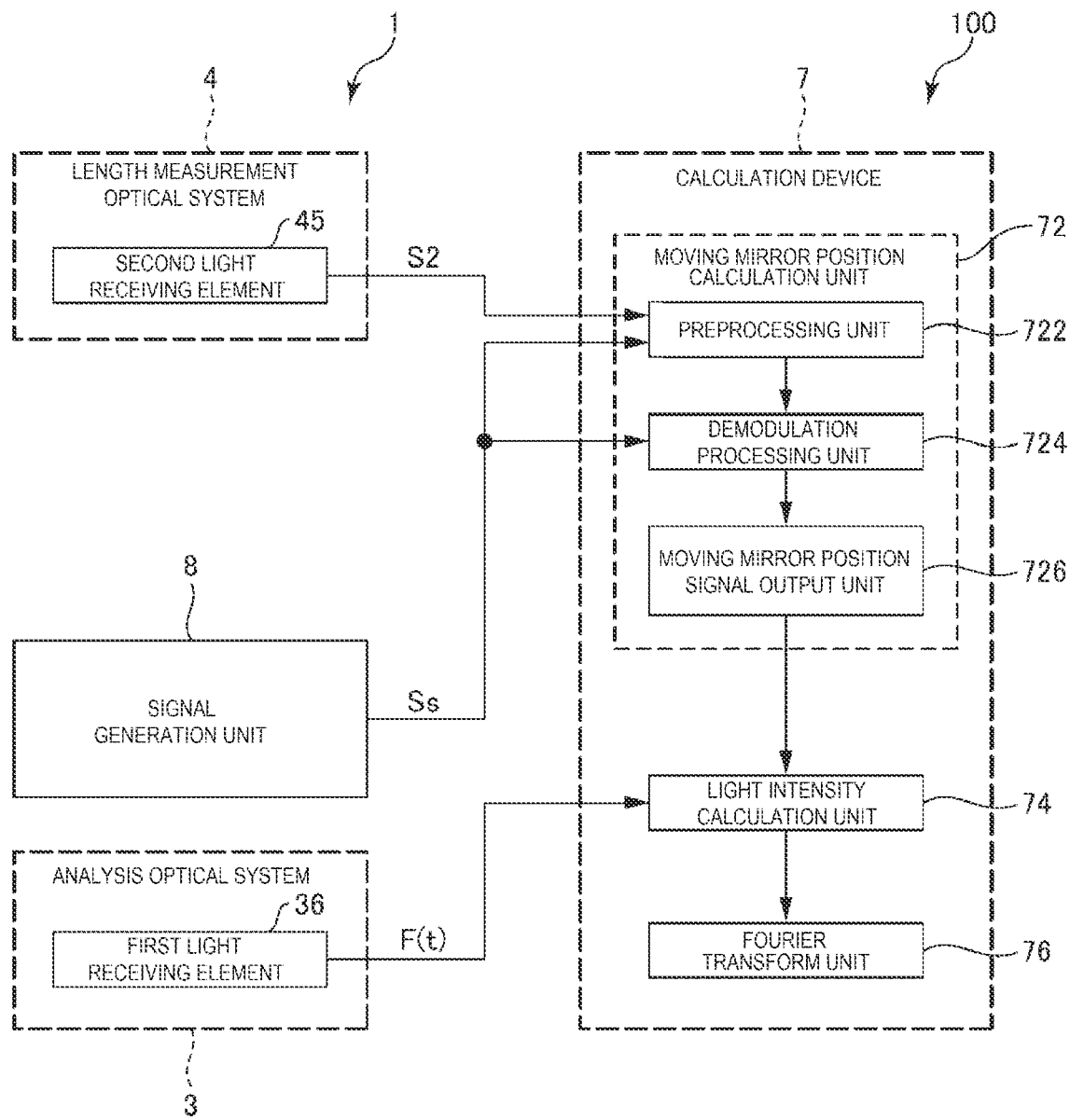
FIG. 9 is a schematic diagram showing main parts of an analysis optical system, a length measurement optical system, a signal generation unit, and a calculation device in FIG. 8.

FIG. 8 is a schematic configuration diagram showing the spectroscopic device 100 according to the second embodiment. FIG. 9 is a schematic diagram showing main parts of the analysis optical system 3, the length measurement optical system 4, the signal generation unit 8, and the calculation device 7 in FIG. 8.

Hereinafter, the second embodiment will be described. In the following description, differences from the first embodiment will be mainly described, and the description of similar matters will be omitted.

The spectroscopic device 100 shown in FIG. 8 is the same as the spectroscopic device 100 shown in FIG. 1 except that configurations of the optical feedback unit 43 and the second light dividing element 42 provided in the length measurement optical system 4 are different.

The second light dividing element 42 shown in FIG. 8 includes a beam splitter 424 and a ¼ wavelength plate 482 in addition to the configuration in the first embodiment. That is, the second light dividing element 42 shown in FIG. 8 includes two beam splitters 422 and 424. The length measurement light L2a divided by the beam splitter 422 passes through the optical feedback unit 43, returns to the beam splitter 424, is reflected by the beam splitter 424, and enters the second light receiving element 45. In addition, the length measurement light L2b divided by the beam splitter 422 is reflected by the moving mirror 33, then passes through the beam splitter 422 again, transmits through the beam splitter 424, and enters the second light receiving element 45.

The optical feedback unit 43 shown in FIG. 8 includes mirrors 451 and 452 and an optical modulator 444 instead of the light reflector 442. The mirrors 451 and 452 form an optical path connecting the beam splitter 422 and the beam splitter 424. The optical modulator 444 is provided on the optical path.

The optical modulator 444 shown in FIG. 8 includes an acousto-optics modulator (AOM) 445. The acousto-optics modulator 445 causes a periodic refractive index change in a medium due to a photoelastic effect, and shifts a frequency of transmitted light. The acousto-optics modulator 445 can be replaced with an electro-optic modulator (EOM). The optical modulator 444 superimposes a second modulation signal on the length measurement light L2a. The second modulation signal is a change in frequency that occurs when the length measurement light L2a transmits through the acousto-optics modulator 445.

The signal generation unit 8 shown in FIG. 8 has a function of generating a drive signal Sd. The acousto-optics modulator 445 is driven by the drive signal Sd. By appropriately setting the drive signal Sd, superimposition of the second modulation signal in the acousto-optics modulator 445 can be controlled.

The moving mirror position calculation unit 72 shown in FIG. 8 identifies the position of the moving mirror 33 based on an optical heterodyne interferometry, and generates the moving mirror position signal X(t) based on a result thereof. Specifically, since the length measurement optical system 4 includes the optical modulator 444, it is possible to add the second modulation signal to the length measurement light L2a. In this way, when the length measurement light L2a and L2b interfere with each other, phase information corresponding to the position of the moving mirror 33 can be obtained with higher accuracy based on the obtained interference light. The position of the moving mirror 33 is determined with high accuracy based on the phase information in the calculation device 7. According to the optical heterodyne interferometry, extraction of the phase information is less susceptible to the influence of disturbances, in particular, the influence of stray light having a frequency that becomes noise, and high robustness is given.

The moving mirror position calculation unit 72 shown in FIG. 9 includes a preprocessing unit 722, a demodulation processing unit 724, and a moving mirror position signal output unit 726. The preprocessing unit 722 and the demodulation processing unit 724 may be, for example, a preprocessing unit and a demodulation unit disclosed in JP-A-2022-38156.

The preprocessing unit 722 performs preprocessing on the second light receiving signal S2 based on the reference signal Ss. The demodulation processing unit 724 demodulates a displacement signal corresponding to the position of the moving mirror 33 based on the reference signal Ss from a preprocessed signal output from the preprocessing unit 722.

The moving mirror position signal output unit 726 generates and outputs the moving mirror position signal X(t) based on the displacement signal of the moving mirror 33 demodulated by the demodulation processing unit 724. The moving mirror position signal X(t) determined by the method is a signal representing the position of the moving mirror 33 that changes at each time point. The displacement signal of the moving mirror 33 included in the second light receiving signal S2 captures the displacement of the moving mirror 33 at an interval sufficiently narrower than a wavelength of the length measurement light L2b. For example, when the wavelength of the length measurement light L2b is several hundred of nanometers, a position resolution of the moving mirror 33 indicated by the displacement signal can be less than 10 nm. In contrast, in the first embodiment, ¼ of the wavelength of the length measurement light L2b is a limit of the position resolution. Therefore, the light intensity calculation unit 74 can generate the interferogram F(x) at finer intervals as compared with the first embodiment.

Figure 10:
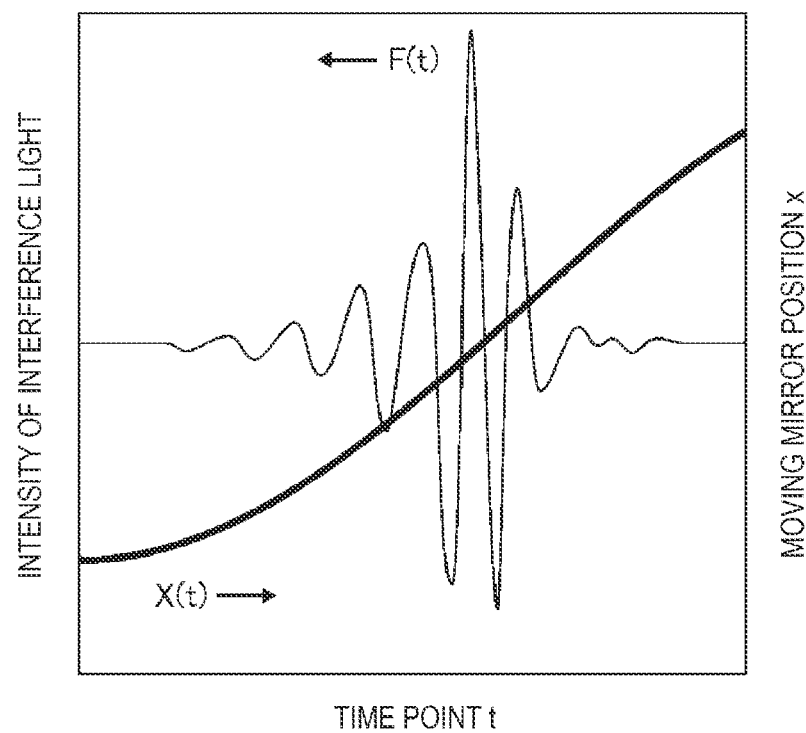
FIG. 10 is a diagram showing an example of the first light receiving signal F(t) and the moving mirror position signal X(t) obtained by the optical device shown in FIG. 8.

FIG. 10 is a diagram showing an example of the first light receiving signal F(t) and the moving mirror position signal X(t) obtained by the optical device 1 shown in FIG. 8. A horizontal axis in FIG. 10 indicates a time point, and a vertical axis indicates the intensity of the interference light incident on the first light receiving element 36 or the position of the moving mirror 33.

The moving mirror position signal X(t) shown in FIG. 10 is a signal capable of continuously detecting changes in the position of the moving mirror 33, and can implement high position resolution. Therefore, by generating the interferogram F(x) based on the moving mirror position signal X(t), the interferogram F(x) having a larger number of data points is obtained. The number of data points means that a sampling interval of the interferogram F(x) is short and accuracy is high. Therefore, by using the interferogram F(x) thus obtained, a spectral pattern having a high resolution can be finally obtained.

In addition, since the sampling interval can be shortened, the interferogram F(x) having a sufficient number of data points can be obtained even when the emitted light L0 having a shorter wavelength (having a larger wavenumber) is used. Accordingly, it is possible to obtain a spectral pattern in a wider wavelength range (wide wavenumber range), that is, a spectral pattern in a wider band.

In addition, accuracy of the moving mirror position signal X(t) can be further enhanced by making a difference between the physical distance between the beam splitter 422 and the optical modulator 444 in the length measurement optical system 4 and the physical distance between the beam splitter 422 and the moving mirror 33 close to zero.

When the position of the moving mirror 33 is measured by the length measurement optical system 4, a measurement error Δd is expressed by the following formula (I).

Math 1

$$\Delta d = \frac{\lambda \Delta \phi}{4\pi n} + WD\left(\frac{\Delta \lambda}{\lambda} + \frac{\Delta n}{n}\right) \quad \text{(I)}$$

λ: WAVELENGTH OF LENGTH MEASUREMENT LIGHT L2b

Δφ: PHASE OF DISPLACEMENT SIGNAL REFLECTING MOVEMENT OF MOVING MIRROR 33 n: AIR REFRACTIVE INDEX

WD: DIFFERENCE BETWEEN PHYSICAL DISTANCE BETWEEN BEAM SPLITTER 422 AND OPTICAL MODULATOR 444 AND PHYSICAL DISTANCE BETWEEN BEAM SPLITTER 422 AND MOVING MIRROR 33

Δλ: FLUCTUATION IN WAVELENGTH OF LENGTH MEASUREMENT LIGHT L2b

Δn: FLUCTUATION IN AIR REFRACTIVE INDEX

By making the difference WD of the physical distance close to zero in the above formula (I), the second term and the third term on the right side that can be a noise component in the measurement error Δd can be reduced. Accordingly, since the measurement error Δd is reduced, the accuracy of the moving mirror position signal X(t) can be further enhanced.

Specifically, when the optical path length between the beam splitter 422 and the optical modulator 444 in the length measurement optical system 4 is Lref and the optical path length between the beam splitter 422 and the moving mirror 33 is Ls, it is preferable that |Ls−Lref|≤100 mm. Accordingly, the difference WD between the physical distances in the above formula (I) can be sufficiently reduced, and the measurement error Δd of the order of 1 nm or less can be achieved.

Further, when a moving distance (amplitude) by which the moving mirror 33 moves back and forth is Lm, based on the moving distance Lm, it is preferable that | Ls−Lref|≤ Lm/2. Accordingly, it is possible to particularly reduce the measurement error Δd while considering the moving distance Lm of the moving mirror 33.

Based on |Ls−Lref|≤100 mm as described above, a maximum value of the moving distance Lm of the moving mirror 33 can be considered to be 200 mm. Therefore, the moving distance Lm of the moving mirror 33 is preferably 200 mm or less. Accordingly, it is possible to particularly reduce the measurement error Δd of the moving mirror 33.

Figure 11:
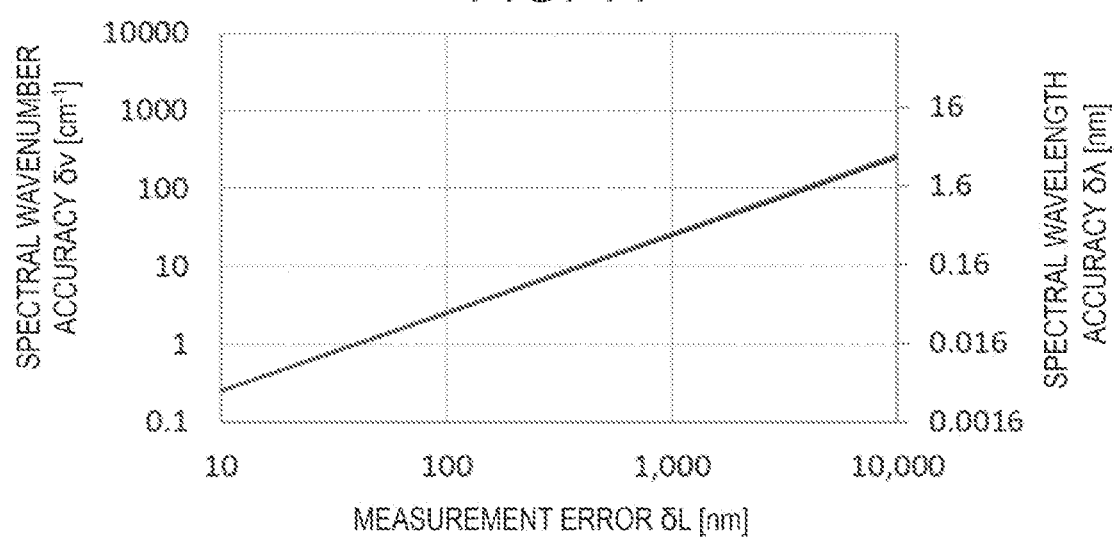
FIG. 11 is a graph showing a relationship between a measurement error in a position of a moving mirror and an error in a spectral wavenumber (spectral wavenumber accuracy) and an error in a spectral wavelength (spectral wavelength accuracy) in a spectral pattern when light (visible light) with a wavelength of 400 nm is used as analysis light.
Figure 12:
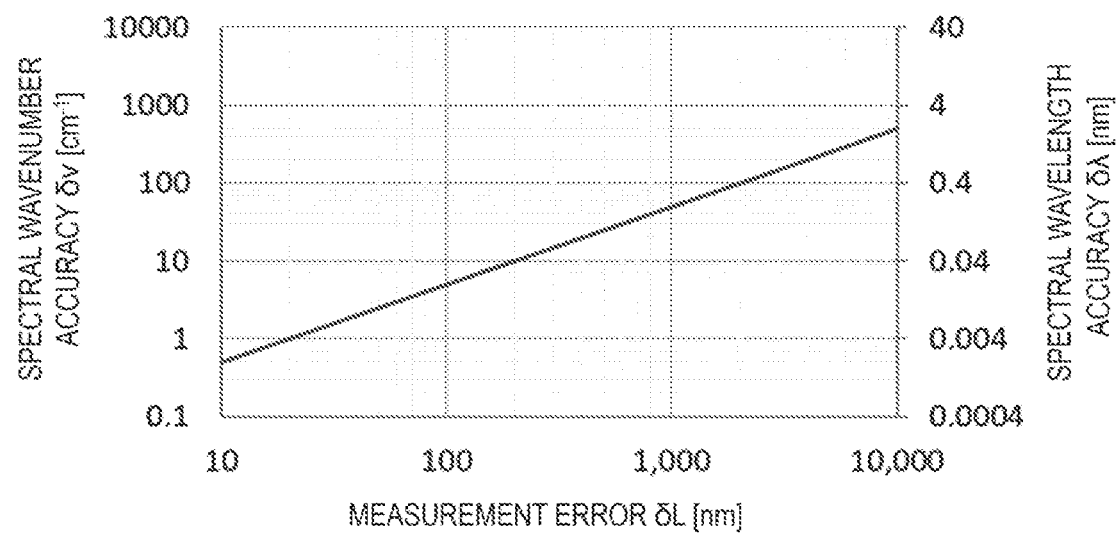
FIG. 12 is a graph showing a relationship between a measurement error in a position of a moving mirror and an error in a spectral wavenumber (spectral wavenumber accuracy) and an error in a spectral wavelength (spectral wavelength accuracy) in a spectral pattern when light (ultraviolet light) with a wavelength of 200 nm is used as the analysis light.

FIG. 11 is a graph showing a relationship between a measurement error δL in a position of the moving mirror 33 and an error in a spectral wavenumber (spectral wavenumber accuracy) and an error in a spectral wavelength (spectral wavelength accuracy) in a spectral pattern when light (visible light) with a wavelength of 400 nm is used as the analysis light L1. FIG. 12 is a graph showing a relationship between the measurement error δL in a position of the moving mirror 33 and an error in a spectral wavenumber (spectral wavenumber accuracy) or an error in a spectral wavelength (spectral wavelength accuracy) in a spectral pattern when using light (ultraviolet light) with a wavelength of 200 nm as the analysis light L1. In the examples shown in FIGS. 11 and 12, the moving distance L of the moving mirror 33 is 1 mm, and the measurement error thereof is &L.

In general, a wavenumber resolution Δv can be enhanced by increasing the moving distance L of the moving mirror 33. For example, when the moving distance L is 1 mm, the wavenumber resolution Δv is 5 $cm^{-1}$, which is calculated based on the spectral pattern obtained by sampling the interferogram by a method in the related art.

In the examples shown in FIGS. 11 and 12, the relationship between the measurement error δL and spectral wavenumber accuracy δv or spectral wavelength accuracy δλ when the moving distance L of the moving mirror 33 is 1 mm is shown. In FIG. 11, for example, when the measurement error δL is 100 nm, the spectral wavenumber accuracy δv is about 2.5 $cm^{-1}$, and the spectral wavelength accuracy δλ is about 0.04 nm. In FIG. 12, for example, when the measurement error δL is 100 nm, the spectral wavenumber accuracy δv is about 5.0 $cm^{-1}$, and the spectral wavelength accuracy δλ is about 0.02 nm. The measurement error δL of 100 nm can be easily achieved by using the optical device 1 according to the embodiment. Then, based on the results from FIGS. 11 and 12, it can be seen that even when light of a shorter wavelength is used as the analysis light L1, as compared with the wavenumber resolution Δv and a wavelength resolution calculated therefrom, the same degree of the spectral wavenumber accuracy δv and the spectral wavelength accuracy δλ can be obtained at least. Therefore, by reducing the measurement error δL using the optical device 1 according to the embodiment, it is possible to maintain or improve the spectral wavenumber accuracy δv and the spectral wavelength accuracy δλ regardless of the wavelength of the analysis light L1, in other words, even when the analysis light L1 having various wavelengths is used.

Figure 13:
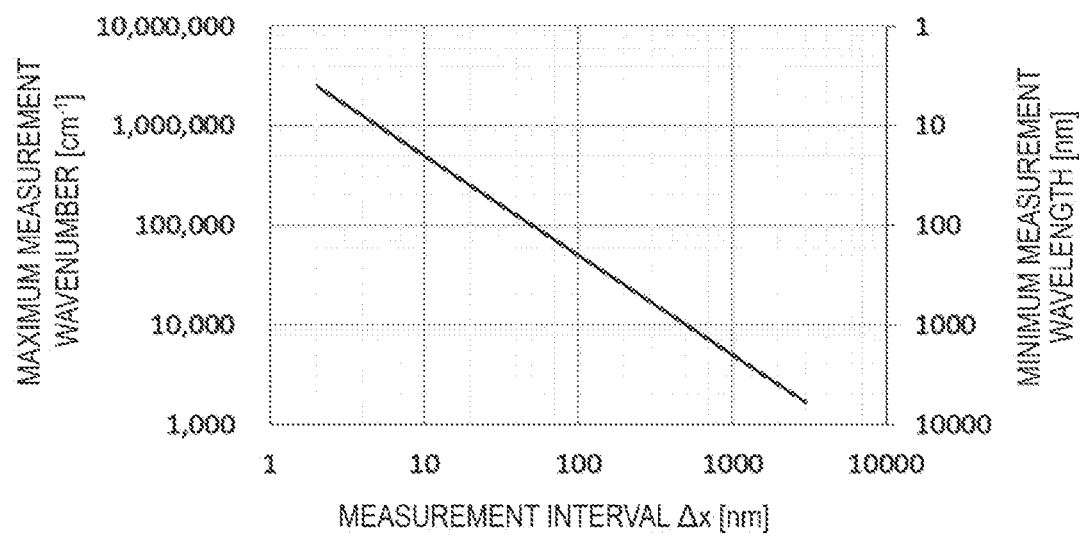
FIG. 13 is a graph showing a relationship between a measurement interval of the position of the moving mirror and a maximum measurement wavenumber and a minimum measurement wavelength in the spectral pattern.

FIG. 13 is a graph showing a relationship between a measurement interval Δx of the position of the moving mirror 33 and a maximum measurement wavenumber and a minimum measurement wavelength in the spectral pattern. As shown in FIG. 13, the smaller the measurement interval Δx, the larger the maximum measurement wavenumber and the shorter the minimum measurement wavelength. Therefore, by reducing the measurement interval Δx, it is possible to obtain a spectral pattern in a wider wavenumber range (wavelength range). In order to implement the stable measurement interval Δx, it is preferable that the measurement error Δd is 1/10 or less of the measurement interval Δx. In this way, in light of FIG. 13, the above-described measurement error Δd on the order of 1 nm can be said to be measurement accuracy that can implement the measurement interval Δx=10 nm.

In the second embodiment described above, effects same as those of the first embodiment can also be obtained.

5. Third Embodiment

Next, an optical device and a spectroscopic device according to a third embodiment will be described.

Figure 14:
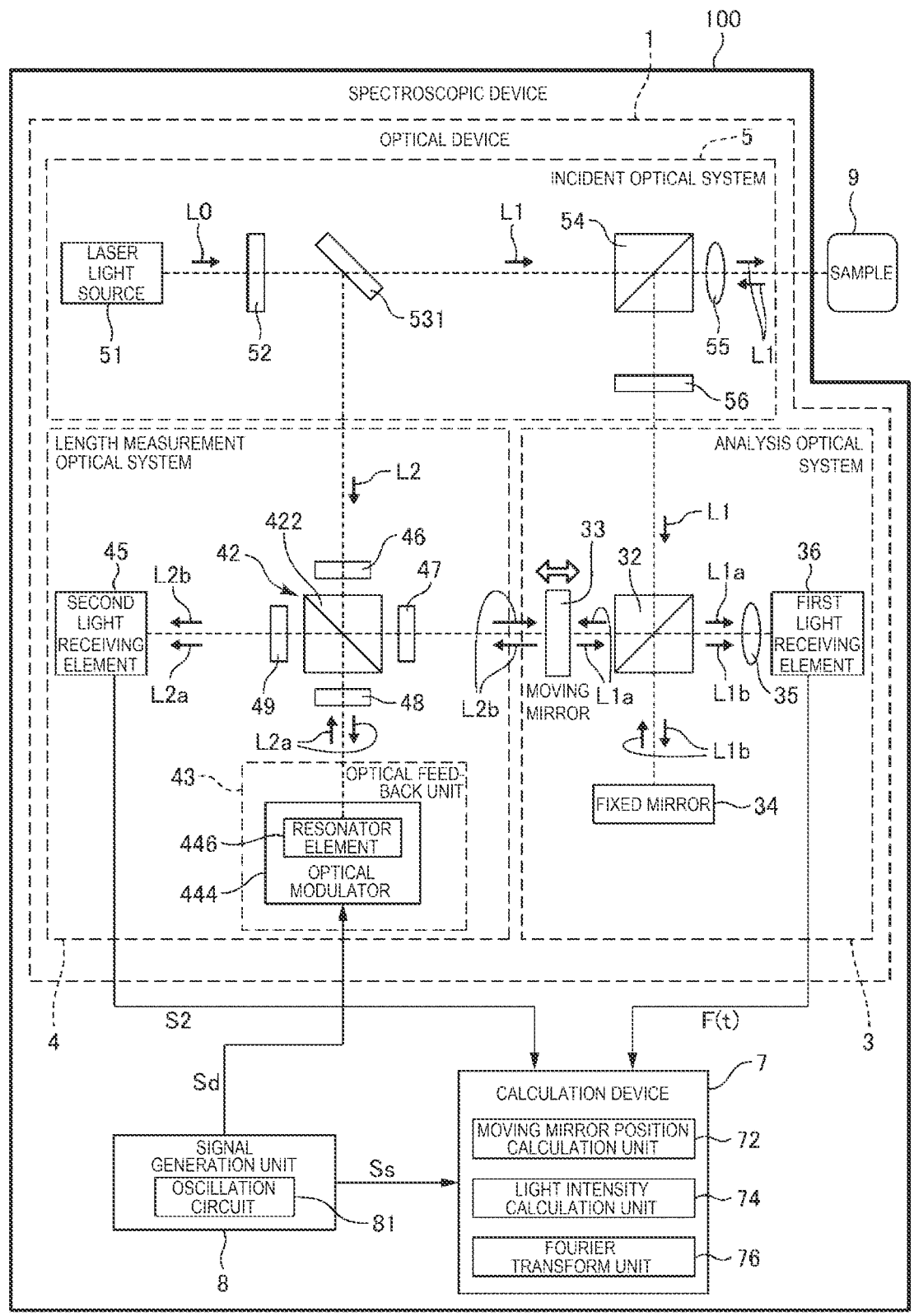
FIG. 14 is a schematic configuration diagram showing a spectroscopic device according to a third embodiment.
Figure 15:
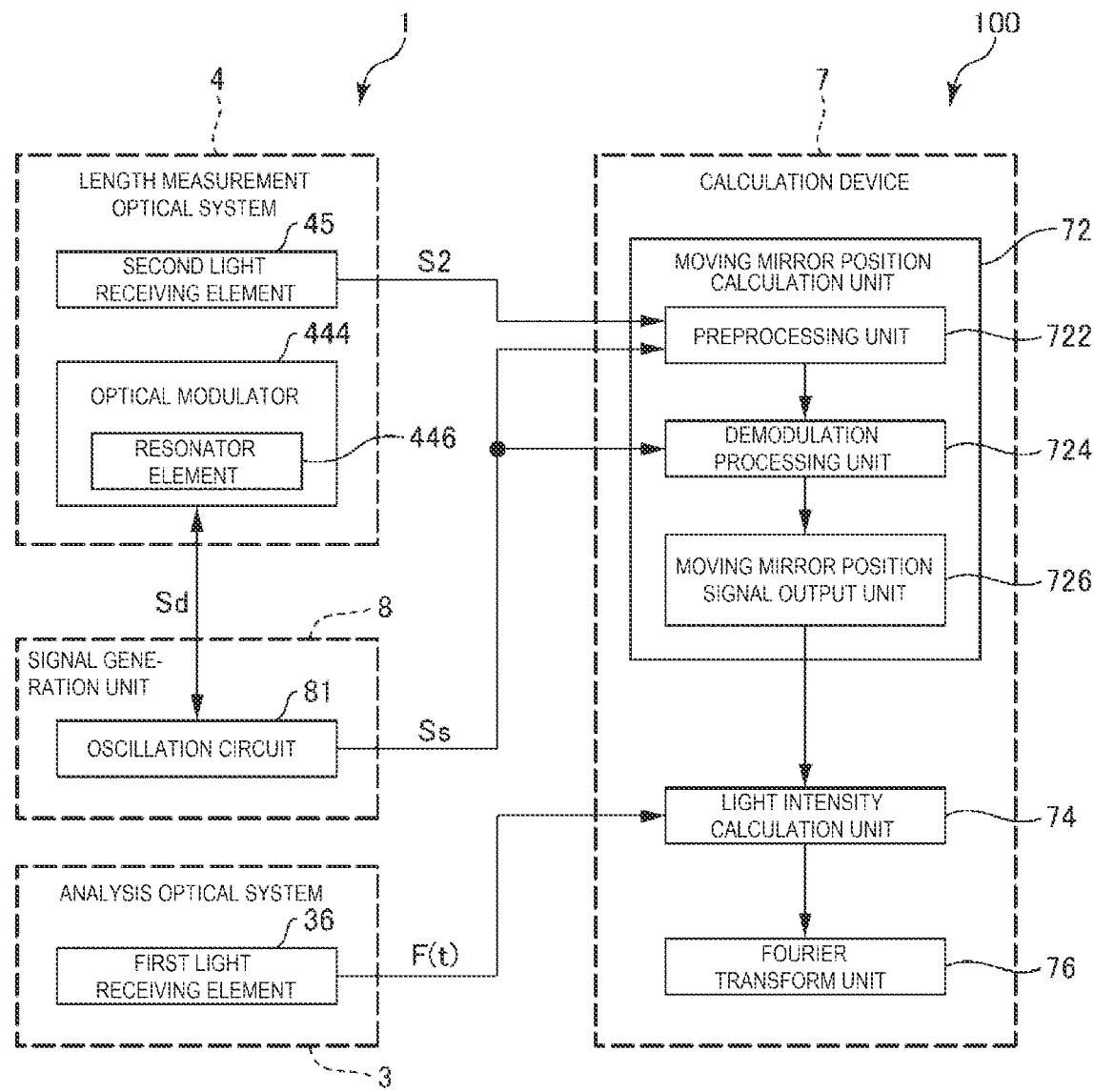
FIG. 15 is a schematic diagram showing main parts of an analysis optical system, a length measurement optical system, a signal generation unit, and a calculation device in FIG. 14.

FIG. 14 is a schematic configuration diagram showing the spectroscopic device 100 according to the third embodiment. FIG. 15 is a schematic diagram showing main parts of the analysis optical system 3, the length measurement optical system 4, the signal generation unit 8, and the calculation device 7 in FIG. 14.

Hereinafter, the third embodiment will be described. In the following description, differences from the second embodiment will be mainly described, and the description of similar matters will be omitted.

The length measurement optical system 4 shown in FIG. 14 is the same as the length measurement optical system 4 shown in FIG. 8 except that the length measurement optical system 4 includes a resonator element 446 instead of the acousto-optics modulator 445 and the configuration of the signal generation unit 8 is different.

The optical modulator 444 shown in FIG. 14 includes the resonator element 446. The resonator element 446 vibrates in response to the drive signal Sd. Examples of the resonator element 446 include a quartz crystal resonator, a silicon resonator, a ceramic resonator, and a piezo element. Among these, the resonator element 446 is preferably a quartz crystal resonator, a silicon resonator, or a ceramic resonator. Unlike other resonators such as piezo elements, these resonators are resonators that utilize a mechanical resonance phenomenon, and therefore have a high Q value and can easily stabilize a natural frequency.

In addition, the optical modulator 444 having the resonator element 446 can be significantly reduced in volume and weight as compared with an optical modulator having an AOM or an EOM. Therefore, it is possible to reduce a size, a weight, and power consumption of the optical device 1.

An example of the optical modulator 444 is an optical modulator disclosed in JP-A-2022-38156. This publication discloses a quartz crystal AT resonator as a resonator element. In addition, as the resonator element 446, an SC-cut quartz crystal resonator, a tuning fork type quartz crystal resonator, a quartz crystal surface acoustic wave element, or the like may be used.

A silicon resonator is a resonator including a single crystal silicon piece manufactured from a single crystal silicon substrate using a MEMS technique and a piezoelectric film. The MEMS is a micro electro mechanical systems. Examples of a shape of the single crystal silicon piece include cantilever beam shapes such as a two-legged tuning fork type and a three-legged tuning fork type, and a fixed beam shape. An oscillation frequency of the silicon resonator is, for example, about 1 kHz to several hundreds of MHz.

A ceramic resonator is a resonator including a piezoelectric ceramic piece manufactured by firing a piezoelectric ceramic and an electrode. Examples of the piezoelectric ceramic include lead zirconate titanate (PZT) and barium titanate (BTO). An oscillation frequency of the ceramic resonator is, for example, about several hundred kHz to several tens of MHz.

The signal generation unit 8 shown in FIGS. 14 and 15 includes an oscillation circuit 81. The oscillation circuit 81 operates with the resonator element 446 as a signal source to generate a periodic signal with high accuracy. In the signal generation unit 8 shown in FIGS. 14 and 15, the periodic signal generated by the oscillation circuit 81 is output as the drive signal Sd and the reference signal Ss. Accordingly, the drive signal Sd and the reference signal Ss are affected in the same way when subjected to a disturbance. Then, the second modulation signal added through the optical modulator 444 driven by the drive signal Sd and the reference signal Ss are also affected in the same way. Therefore, when the second light receiving signal S2 including the second modulation signal and the reference signal Ss are subjected to calculation in the calculation device 7, the influence of disturbances contained in both signals can be canceled out or reduced in the process of calculation. As a result, the calculation device 7 can determine the position of the moving mirror 33 with higher accuracy even when subjected to the disturbance. In addition, it is possible to reduce the size, the weight, and the power consumption of the spectroscopic device 100.

An example of the oscillation circuit 81 is an oscillation circuit disclosed in JP-A-2022-38156.

Figure 16:
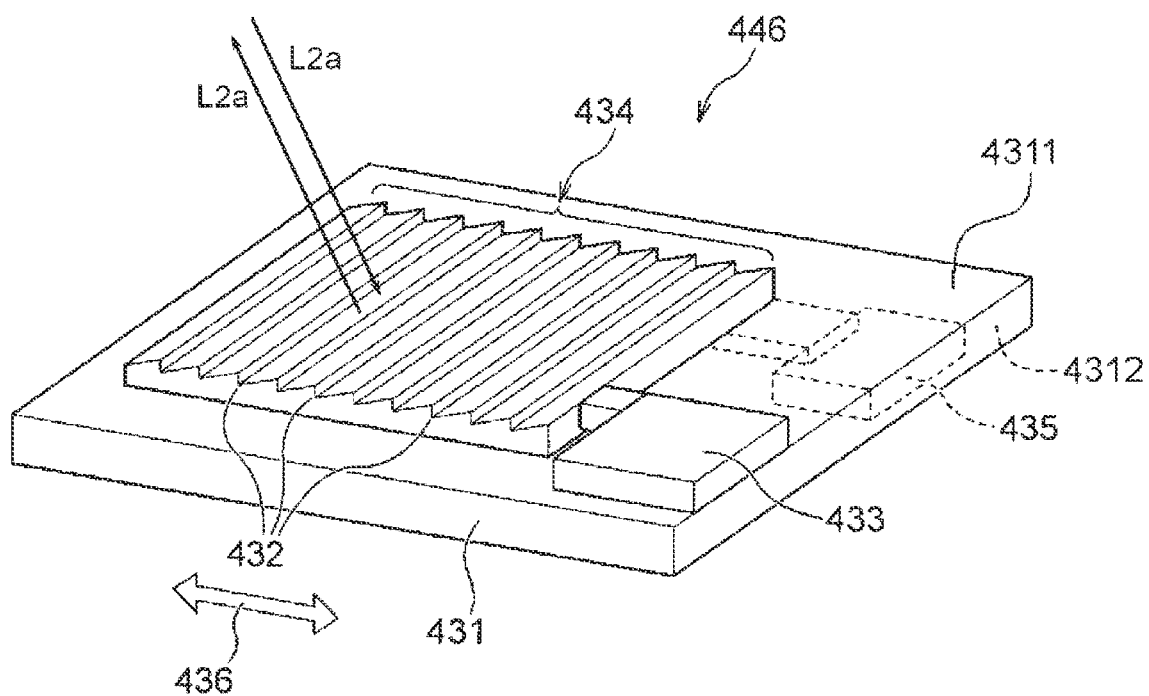
FIG. 16 is a perspective view showing a configuration example of a resonator element shown in FIG. 14.

FIG. 16 is a perspective view showing a configuration example of the resonator element 446 shown in FIG. 14.

The resonator element 446 shown in FIG. 16 includes a plate-shaped resonator element 431 and a diffraction grating 434 provided on the resonator element 431.

The resonator element 431 is made of a material that repeats a resonating mode to be distorted in a direction along a surface when a potential is applied thereto. The resonator element 431 shown in FIG. 16 is a quartz crystal AT resonator that vibrates through thickness shear along a vibration direction 436 in a high frequency range of a MHz band. The diffraction grating 434 is provided on the surface of the resonator element 431. The diffraction grating 434 includes grooves 432 having a component intersecting the vibration direction 436, that is, a plurality of linear grooves 432 extending in a direction intersecting the vibration direction 436.

The resonator element 431 has a surface 4311 and a back surface 4312 which have a front and back relationship with each other. The diffraction grating 434 is disposed on the surface 4311. In addition, the surface 4311 is provided with a pad 433 for applying a potential to the resonator element 431. Further, a pad 435 for applying a potential to the resonator element 431 is also provided on the back surface 4312.

A size of the resonator element 431 is, for example, about 0.50 mm or more and 10.0 mm or less. A thickness of the resonator element 431 is, for example, about 0.10 mm or more and 2.0 mm or less. As an example, a shape of the resonator element 431 is a square with one side of 1.6 mm, and a thickness thereof is 0.35 mm.

A size of the diffraction grating 434 is, for example, about 0.20 mm or more and 3.0 mm or less. A thickness of the diffraction grating 434 is, for example, about 0.003 mm or more and 0.5 mm or less.

In the embodiment, although the resonator element 431 vibrates in a thickness-shear manner, since the vibration is an in-plane vibration, as shown as the vibration direction 436 in FIG. 16, even when light is perpendicularly incident to the surface of the resonator element 431 alone, optical modulation cannot be performed. Therefore, in the resonator element 446, the optical modulation is enabled by providing the diffraction grating 434 in the resonator element 431.

The diffraction grating 434 shown in FIG. 16 is a blazed diffraction grating as an example. The blazed diffraction grating refers to a grating in which a cross-sectional shape of the diffraction grating is stepped. The shape of the diffraction grating 434 is not limited thereto.

Figure 17:
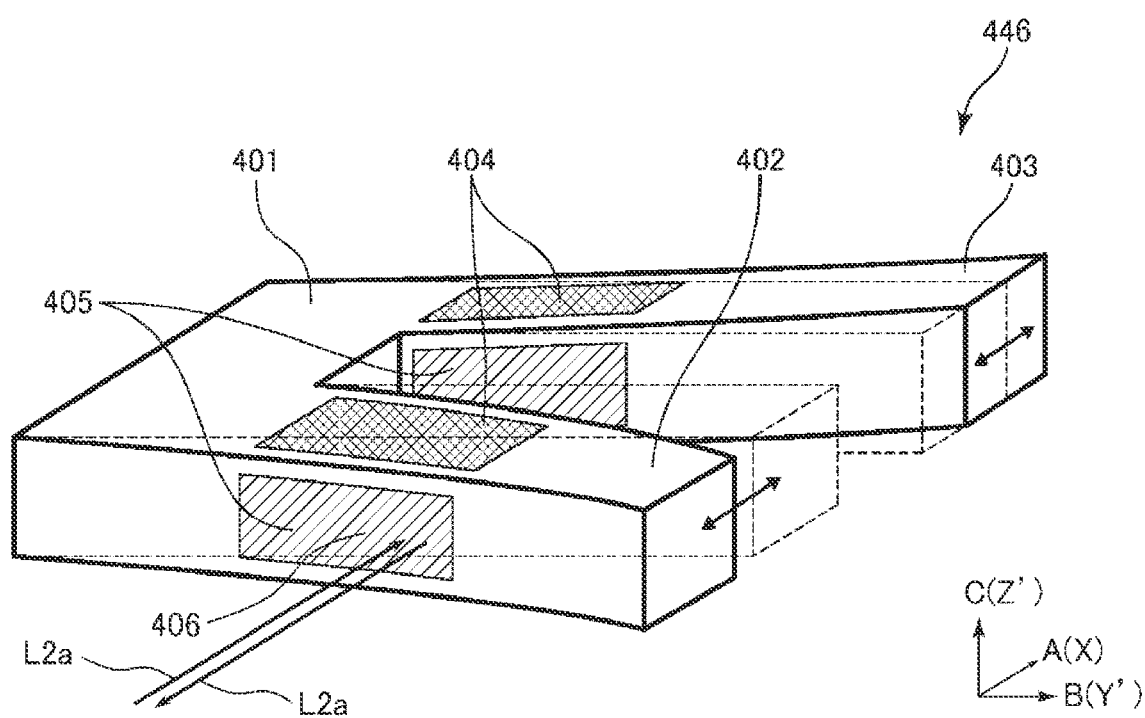
FIG. 17 is a perspective view showing another configuration example of the resonator element shown in FIG. 14.

FIG. 17 is a perspective view showing another configuration example of the resonator element 446 shown in FIG. 14. In FIG. 17, an A-axis, a B-axis, and a C-axis are set as three axes orthogonal to one another, and are indicated by arrows. A tip side of the arrow is defined as "plus", and a base end side of the arrow is defined as "minus". In addition, for example, both plus and minus directions of the A-axis are referred to as an "A-axis direction". The same applies to a B-axis direction and a C-axis direction.

The resonator element 446 shown in FIG. 17 is a tuning fork type quartz crystal resonator. The resonator element 446 shown in FIG. 17 includes a vibration substrate having a base 401 and a first vibrating arm 402 and a second vibrating arm 403. Such a tuning fork type quartz crystal resonator is easily available because a manufacturing technique is established, and oscillation is also stable. Therefore, the tuning fork type quartz crystal resonator is suitable as the resonator element 446. The resonator element 446 includes electrodes 404 and 405 and a light reflective surface 406 provided on the vibration substrate.

The base 401 is a portion extending along the A-axis. The first vibrating arm 402 is a portion extending from an end of the base 401 on an A-axis minus side toward a B-axis plus side. The second vibrating arm 403 is a portion extending from a portion of the base 401 on an A-axis plus side toward the B-axis plus side.

The electrodes 404 are conductive films provided on side surfaces parallel to an A-B plane of the first vibrating arm 402 and the second vibrating arm 403. Although not shown in FIG. 17, the electrodes 404 are provided on the side surfaces facing each other, and the first vibrating arm 402 is driven by applying voltages with different polarities.

The electrodes 405 are conductive films provided on side surfaces intersecting with the A-B plane of the first vibrating arm 402 and the second vibrating arm 403. Although not shown in FIG. 17, the electrodes 405 are also provided on the side surfaces facing each other, and the second vibrating arm 403 is driven by applying voltages with different polarities.

The light reflective surface 406 is set on a side surface intersecting with the A-B plane of the first vibrating arm 402 and the second vibrating arm 403, and has a function of reflecting the length measurement light L2a. The side surface refers to a surface spreading along the extending direction of the first vibrating arm 402 and the second vibrating arm 403. The light reflective surface 406 shown in FIG. 17 is set on a side surface of the first vibrating arm 402, particularly on a surface of the electrode 405. The electrode 405 provided on the first vibrating arm 402 also has a function as the light reflective surface 406. A light reflection film (not shown) may be provided separately from the electrodes 405.

A tuning fork type quartz crystal resonator uses a quartz crystal piece cut out from a quartz crystal substrate. Examples of the quartz crystal substrate used for manufacturing the tuning fork type quartz crystal resonator include a quartz crystal Z-cut flat plate. In FIG. 17, an X-axis parallel to the A-axis, a Y'-axis parallel to the B-axis, and a Z'-axis parallel to the C-axis are set. A quartz crystal Z-cut flat plate is, for example, a substrate cut out of a single crystal of quartz crystal so that the X-axis is an electrical axis, the Y'-axis is a mechanical axis, and the Z'-axis is an optical axis. Specifically, in an orthogonal coordinate system including the X-axis, Y'-axis and Z'-axis, a substrate having a main surface inclined by about 1° to 5° in a counterclockwise direction on an X-Y' plane including the X-axis and the Y'-axis around the X-axis is preferably cut out from a single crystal of a quartz crystal and is preferably used as a quartz crystal substrate. By etching such a quartz crystal substrate, a quartz crystal piece used in the resonator element 446 shown in FIG. 17 is obtained. The etching may be wet etching or dry etching.

Further, the light reflective surface 406 may be set on the surface of the electrode 404. In this case, a signal applied to each electrode may be adjusted so that the tuning fork type quartz crystal resonator performs an out-of-plane vibration, for example, so as to excite spurious waves that performs the out-of-plane vibration.

6. First Modification of Third Embodiment

Next, an optical device and a spectroscopic device according to a first modification of the third embodiment will be described.

Figure 18:
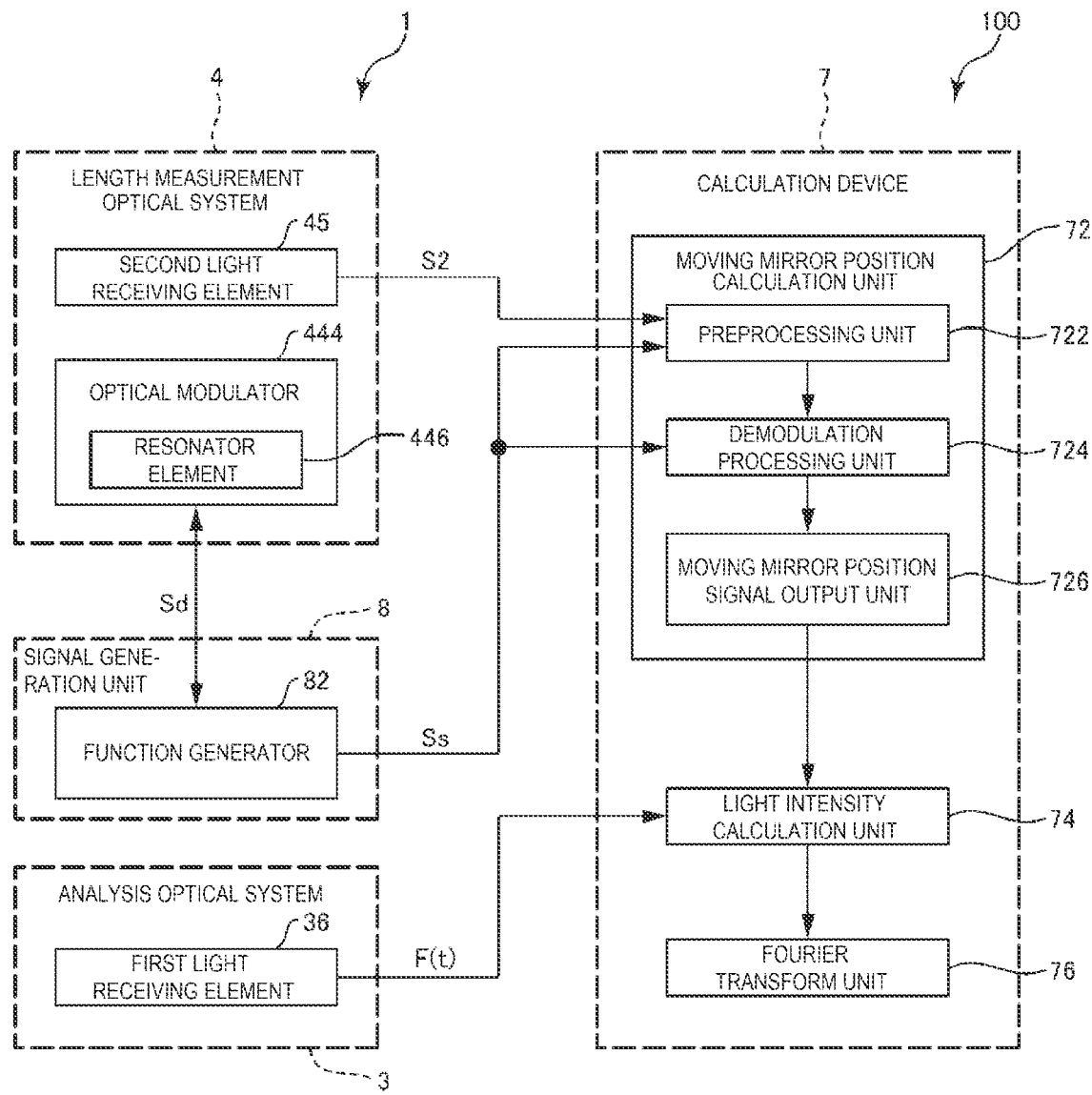
FIG. 18 is a schematic diagram showing main parts of an analysis optical system, a length measurement optical system, a signal generation unit, and a calculation device provided in a spectroscopic device according to a first modification of the third embodiment.

FIG. 18 is a schematic diagram showing main parts of the analysis optical system 3, the length measurement optical system 4, the signal generation unit 8, and the calculation device 7 provided in the spectroscopic device 100 according to the first modification of the third embodiment.

The spectroscopic device 100 shown in FIG. 18 is the same as the spectroscopic device 100 shown in FIG. 2 except that a configuration of the signal generation unit 8 is different.

The signal generation unit 8 shown in FIG. 18 includes a function generator 82. The function generator 82 is a signal generator that outputs a highly accurate waveform, that is, a signal with high stability and low jitter. Therefore, the signal generation unit 8 shown in FIG. 18 can output the drive signal Sd and the reference signal Ss with higher accuracy, and can finally determine the position of the moving mirror 33 in the calculation device 7 with higher accuracy. The function generator 82 may be a signal generator.

In the first modification described above, effects same as those of the third embodiment can also be obtained.

7. Second Modification of Third Embodiment

Next, a spectroscopic device according to a second modification of the third embodiment will be described.

Figure 19:
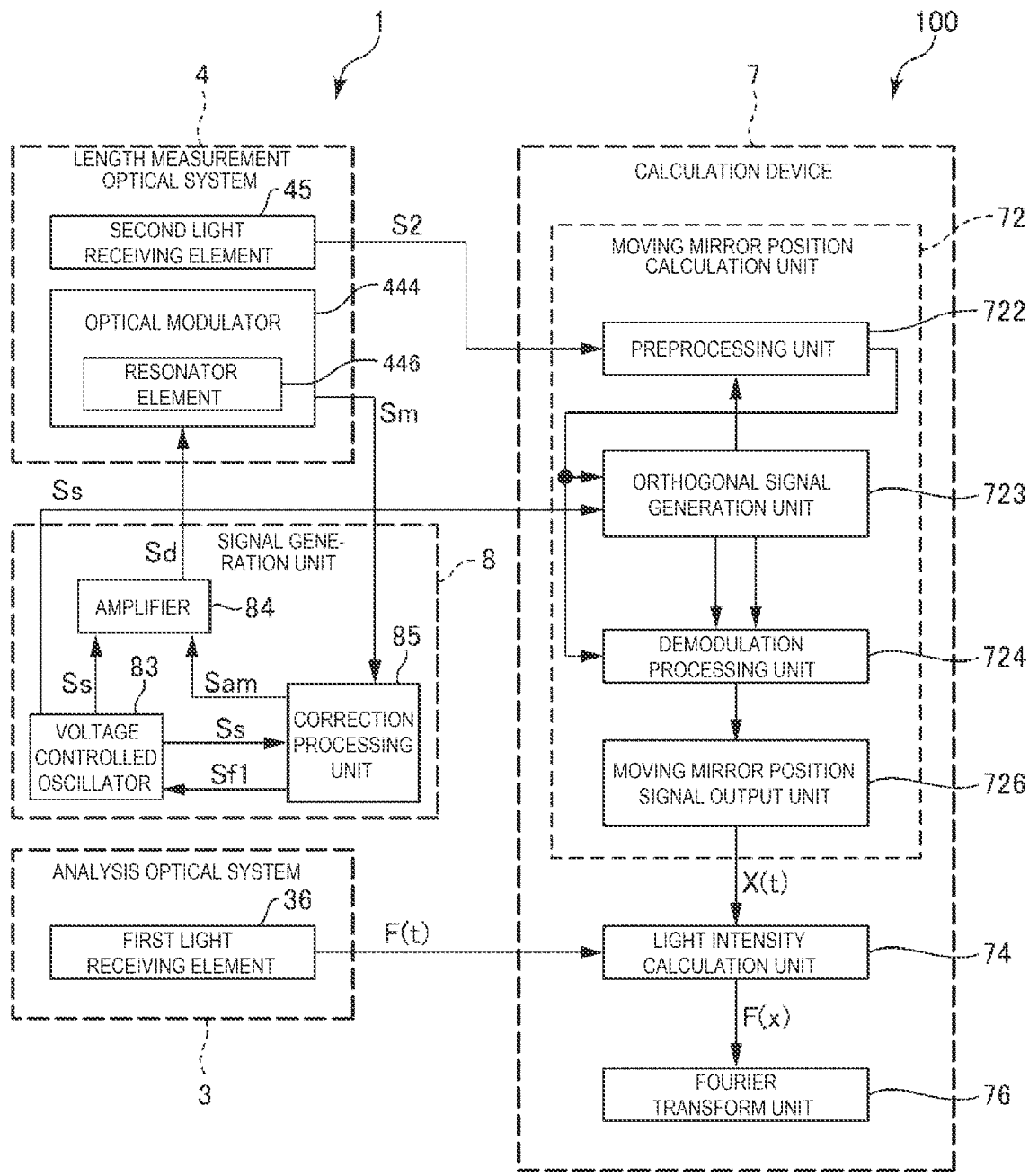
FIG. 19 is a schematic diagram showing main parts of an analysis optical system, a length measurement optical system, a signal generation unit, and a calculation device provided in a spectroscopic device according to a second modification of the third embodiment.

FIG. 19 is a schematic diagram showing main parts of the analysis optical system 3, the length measurement optical system 4, the signal generation unit 8, and the calculation device 7 provided in the spectroscopic device 100 according to the second modification of the third embodiment.

The spectroscopic device 100 shown in FIG. 19 is the same as the spectroscopic device 100 shown in FIG. 2 except that a configuration of the signal generation unit 8 and a configuration of the calculation device 7 are different.

The signal generation unit 8 shown in FIG. 19 includes a voltage controlled oscillator 83, an amplifier 84, and a correction processing unit 85. The moving mirror position calculation unit 72 shown in FIG. 19 further includes an orthogonal signal generation unit 723.

7.1. Signal Generation Unit

First, the signal generation unit 8 shown in FIG. 19 will be described.

7.1.1. Configuration of Signal Generation Unit

The voltage controlled oscillator 83 is a VCO, and has a function of controlling a frequency of an output periodic signal based on an input voltage signal. Accordingly, the voltage controlled oscillator 83 generates the reference signal Ss of a target frequency and outputs the reference signal Ss to the amplifier 84 and the calculation device 7. The voltage controlled oscillator 83 is not limited to the VCO as long as it is an oscillator that can adjust the frequency of the output periodic signal.

The amplifier 84 has a function of controlling the amplitude of the output periodic signal based on the input control signal. Accordingly, the amplifier 84 amplifies the input reference signal Ss, generates the drive signal Sd of the target amplitude, and outputs the drive signal Sd to the optical modulator 444.

As shown in FIG. 19, the reference signal Ss output from the voltage controlled oscillator 83 and an output signal Sm output corresponding to driving of the optical modulator 444 are input to the correction processing unit 85. In addition, the correction processing unit 85 outputs a frequency control signal Sf1 (correction signal) to the voltage controlled oscillator 83. Further, the correction processing unit 85 outputs an amplification factor control signal Sam (correction signal) to the amplifier 84.

The correction processing unit 85 is mounted on, for example, an FPGA, and is preferably disposed in the vicinity of the optical modulator 444. Accordingly, the physical distance between the optical modulator 444 and the correction processing unit 85 can be shortened, and a decrease in an S/N ratio of the output signal Sm due to the influence of, for example, electromagnetic noise, can be prevented.

Figure 20:
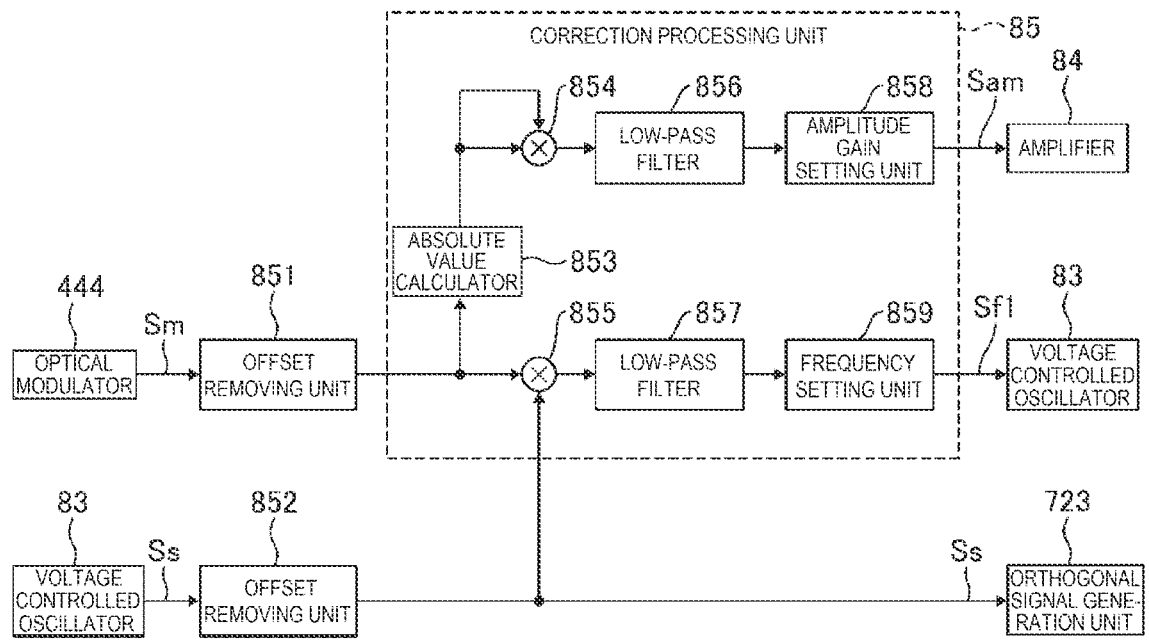
FIG. 20 is a diagram showing details of a correction processing unit in the schematic diagram shown in FIG. 19.

FIG. 20 is a diagram showing details of the correction processing unit 85 in the schematic diagram shown in FIG. 19. The output signal Sm from the optical modulator 444 is input to an offset removing unit 851 shown in FIG. 20. The offset removing unit 851 has a function of removing a DC (direct current) component and extracting an AC (alternating current) component. The output signal Sm passing through the offset removing unit 851 is input to the correction processing unit 85.

The reference signal Ss from the voltage controlled oscillator 83 is input to an offset removing unit 852 shown in FIG. 20. The offset removing unit 852 has a function of removing a DC (direct current) component and extracting an AC (alternating current) component. The reference signal Ss passing through the offset removing unit 852 is input to the correction processing unit 85 and the orthogonal signal generation unit 723.

The correction processing unit 85 shown in FIG. 20 includes an absolute value calculator 853, a multiplier 854, a multiplier 855, a low-pass filter 856, a low-pass filter 857, an amplitude gain setting unit 858, and a frequency setting unit 859.

The absolute value calculator 853 calculates an absolute value of the output signal Sm passing through the offset removing unit 851.

The multipliers 854 and 855 are circuits that output signals proportional to a product of the two input signals. Among these, in the multiplier 854, both of the two input signals are the output signal Sm. Therefore, the multiplier 854 outputs a signal proportional to the square of the output signal Sm. Further, in the multiplier 855, the two input signals are the output signal Sm and the reference signal Ss. Therefore, the multiplier 855 outputs a signal proportional to the product of the output signal Sm and the reference signal Ss.

Each of the multipliers 854 and 855 may be, for example, an element such as a Gilbert cell, or may be a circuit that performs logarithmic conversion of two input signals using an operational amplifier or the like, then performs addition and subtraction, and then performs inverse logarithmic conversion.

The low-pass filters 856 and 857 are filters that cut signals in a high frequency band of the input signals. A transmission frequency band of the low-pass filters 856 and 857 may be a band that can remove twice or more the frequency of the drive signal Sd, and is preferably a band that can remove frequencies equal to or higher than the frequency of the drive signal Sd.

A signal output from the multiplier 854 and passing through the low-pass filter 856 is a signal having a value corresponding to the amplitude of the output signal Sm, as will be described later. The amplitude gain setting unit 858 has a function of determining, based on the signal, an amplitude (target amplitude) to be set in the drive signal Sd. Further, the amplitude gain setting unit 858 controls a gain (amplification factor) to be set in the amplifier 84 of the signal generation unit 8 so that the amplitude of the drive signal Sd is the target amplitude. Examples of a control logic include feedback control such as PI control and PID control. The amplitude gain setting unit 858 outputs, to the amplifier 84, the amplification factor control signal Sam corresponding to the gain to be set.

The amplifier 84 amplifies the amplitude of the drive signal Sd based on the amplification factor control signal Sam. Accordingly, the amplitude of the drive signal Sd is corrected.

The signal output from the multiplier 855 and input to the frequency setting unit 859 through the low-pass filter 857 is a signal having a value corresponding to a phase difference between the output signal Sm and the reference signal Ss, as will be described later. Here, a phase of the output signal Sm corresponds to a phase of the drive signal Sd. The phase of the drive signal Sd corresponds to the phase of the reference signal Ss. Therefore, the frequency setting unit 859 has a function of determining the frequency (target frequency) to be set in the reference signal Ss. Further, the frequency setting unit 859 controls a voltage to be set in the voltage controlled oscillator 83 of the signal generation unit 8 so that the frequency of the reference signal Ss is the target frequency. Examples of a control logic include feedback control such as PI control and PID control. The frequency setting unit 859 outputs, to the voltage controlled oscillator 83, the frequency control signal Sf1 corresponding to the frequency to be set.

The voltage controlled oscillator 83 generates the reference signal Ss having a frequency corresponding to the frequency control signal Sf1. Accordingly, the frequency of the reference signal Ss is corrected. Accordingly, the frequency of the drive signal Sd is also corrected.

7.1.2. Obtaining of Output Signal from Optical Modulator

Figure 21:
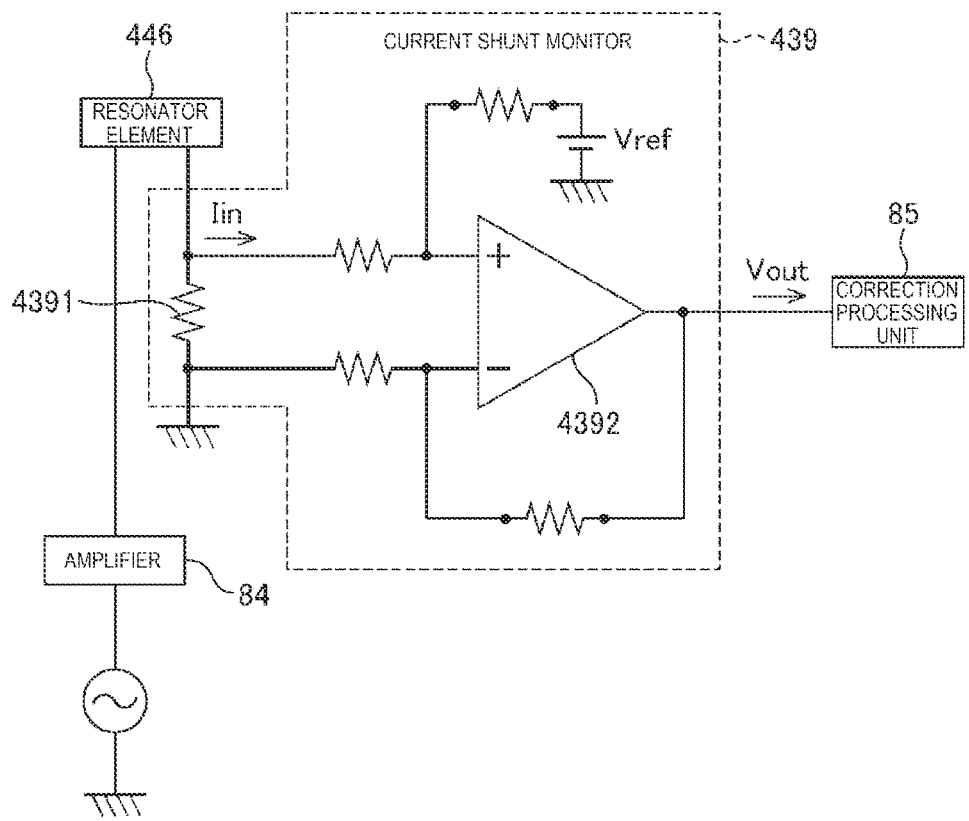
FIG. 21 is a diagram showing an example of a circuit that obtains an output signal from an optical modulator.

FIG. 21 is a diagram showing an example of a circuit that obtains the output signal Sm from the optical modulator 444.

The output signal Sm may be a signal obtained by detecting a current flowing through the resonator element 446 provided in the optical modulator 444, or may be a signal obtained by detecting a voltage applied to the resonator element 446. For example, when the signal obtained by detecting the current flowing through the resonator element 446 is the output signal Sm, as shown in FIG. 21, a current value flowing through the resonator element 446 is detected using a current shunt monitor 439. The current shunt monitor 439 shown in FIG. 21 includes a shunt resistor 4391 and an operational amplifier 4392, and converts the current value flowing through the resonator element 446 into a voltage value and detects the voltage value. Accordingly, the output signal Sm, which is a voltage signal, is obtained. The obtained output signal Sm is converted into a digital signal and output to the correction processing unit 85.

In addition to the above-described method, examples of a method of detecting the current flowing through the resonator element 446 include a method using a Hall element, and a method of winding coils around a current path and detecting an electromotive force.

7.1.3. Correction Processing

Next, correction processing performed by the correction processing unit 85 will be described. The correction processing is to correct the drive signal Sd and the reference signal Ss by changing setting values of the voltage controlled oscillator 83 and the amplifier 84 based on the correction signal output from the correction processing unit 85.

When the output signal Sm from the optical modulator 444 is, for example, a voltage signal, the output signal Sm before passing through the offset removing unit 851 is expressed by the following formula (II).

Math 2

$$V_{QOM} = A_m \sin(\omega_m t + \alpha_{m1}) + O_{QOM} \qquad (II)$$

In the formula (II), $V_{QCM}$ is a voltage value of the output signal Sm. In addition, $A_m$ is a coefficient corresponding to the amplitude of the output signal Sm, and $\alpha_{m1}$ is a phase difference with respect to the reference signal Ss of the output signal Sm, and satisfies $-\pi/2 < \alpha_{m1} < \pi/2$. Further, $O_{QOM}$ is a DC component of the output signal Sm.

The output signal Sm after passing through the offset removing unit 851 is expressed by the following formula (II-1).

Math 3

$$V_{QOM} = A_m \sin(\omega_m t + \alpha_{m1}) \qquad (II\text{-}1)$$

Further, the reference signal Ss before passing through the offset removing unit 852 is expressed by the following formula (III).

Math 4

$$V_{OSC} = v_{OSC} \cos(\omega_m t) + O_{OSC} \qquad (III)$$

In the above formula (III), $V_{OSC}$ is a voltage value of the reference signal Ss. In addition, $V_{OSC}$ is a coefficient corresponding to the amplitude of the reference signal Ss, and $O_{OSC}$ is a DC component of the reference signal Ss.

The reference signal Ss after passing through the offset removing unit 852 is expressed by the following formula (III-1).

Math 5

$$V_{OSC} = v_{OSC}\cos(\omega_m t) \quad \text{(III-1)}$$

The output signal Sm passing through the offset removing unit 851 is divided into two. Further, one output signal Sm passes through the absolute value calculator 853, and is squared by the multiplier 854, and as a result, the result is expressed by the following formula (II-2).

Math 6

$$V_{QOM}^2 = \frac{A_m^2}{2}\{1 - \cos(2\omega_m t + 2\alpha_{m1})\} \quad \text{(II-2)}$$

Thereafter, by passing through the low-pass filter 856, only the first term on the right side of the above formula (II-2) is extracted. Accordingly, the output signal Sm after passing through the low-pass filter 856 is expressed by the following formula (II-3).

Math 7

$$V_{QOM}^2 = \frac{A_m^2}{2} \quad \text{(II-3)}$$

As expressed by the above formula (II-3), an input signal $V_{QCM}^2$ input to the amplitude gain setting unit 858 is a signal with no time change. Therefore, the amplitude gain setting unit 858 performs feedback control on the output signal Sm expressed by the above formula (II-3), using a value obtained by substituting the target coefficient $A_m$ into the above formula (II-3) as a control target value. The amplification factor control signal Sam corresponding to the control target value is output toward the amplifier 84 of the signal generation unit 8. Accordingly, by changing an amplitude gain in the amplifier 84, the amplitude of the drive signal Sd can be corrected to a target amplitude.

The other output signal Sm divided into two is multiplied by the reference signal Ss by the multiplier 855. Accordingly, the signal output from the multiplier 855 is expressed by the following formula (IV).

Math 8

$$V_{QOM} \cdot V_{OSC} = \frac{A_m v_{OSC}}{2}\{\sin(\alpha_{m1}) + \sin(2\omega_m t + \alpha_{m1})\} \quad \text{(IV)}$$

Thereafter, by passing through the low-pass filter 857, only the first term on the right side of the above formula (IV) is extracted. Accordingly, the output signal Sm after passing through the low-pass filter 857 is expressed by the following formula (IV-2).

Math 9

$$V_{QOM} \cdot V_{OSC} = \frac{A_m v_{OSC}}{2}\sin(\alpha_{m1}) \quad \text{(IV-2)}$$

As expressed by the above formula (IV-2), an input signal $V_{QCM} \cdot V_{OSC}$ input to the frequency setting unit 859 is a signal including the coefficient $A_m$, a coefficient $V_{OSC}$, and a phase difference $\alpha_{m1}$ on the right side. Among these, the coefficient $V_{OSC}$ is known. On the other hand, the coefficient $A_m$ satisfies $0 < A_m$ and is controlled to converge to the target coefficient $A_m$ as described above. Therefore, the input signal $V_{QCM} \cdot V_{OSC}$ is a signal with no time change. Therefore, the frequency setting unit 859 performs the feedback control using, for example, a value obtained by substituting the target phase difference $\alpha_{m1}$ into the above formula (IV-2) as the control target value. The frequency control signal Sf1 corresponding to the control target value is output toward the voltage controlled oscillator 83 of the signal generation unit 8. Accordingly, the frequency of the reference signal Ss output from the voltage controlled oscillator 83 can be changed, and the frequency of the reference signal Ss can be corrected to a target frequency. The frequency of the drive signal Sd can also be corrected to the target frequency.

The target phase difference $\alpha_{m1}$ can be determined based on, for example, a relationship of the phase difference between the drive signal Sd and the output signal Sm in the resonator element 446 that vibrates at a mechanical resonance frequency. Specifically, in such a resonator element 446, it is known that the phase of the output signal Sm is delayed by about 90 [deg] with respect to the input drive signal Sd. In addition, in a process until the output signal Sm is input to the correction processing unit 85, a phase delay $\delta$ [deg] may occur. Considering these, the target phase difference $\alpha_{m1}$ can be set to, for example, 90+$\delta$[deg]. The phase delay $\delta$ can be determined by experiment or simulation.

When a temperature change or the like occurs, the mechanical resonance frequency changes, and efficiency of converting power input to the resonator element 446 into a vibration may change. When the conversion efficiency changes, the amplitude of the vibration of the resonator element 446 changes. Therefore, in the correction processing, first, priority is given to correcting the frequency of the reference signal Ss and the frequency of the drive signal Sd. Thereafter, the amplitude of the drive signal Sd is corrected as necessary. By executing the correction processing in such an order, it is possible to efficiently control the frequency and the amplitude to a target value.

In addition, based on the control by the frequency setting unit 859 described above, it is desirable that the control of the signal input to the amplitude gain setting unit 858 converges earlier than the control of the signal input to the frequency setting unit 859. Accordingly, since a target control value in the frequency setting unit 859 is prevented from becoming unstable, it is possible to prevent the correction processing from becoming unstable.

The amplitude gain setting unit 858 and the frequency setting unit 859 are each constructed by combining operational amplifiers and the like to perform a feedback control operation such as PID control. In this case, in order to converge the control of the signal input to the amplitude gain setting unit 858 earlier than the control of the signal input to the frequency setting unit 859, a crossing frequency of an open loop transfer function of a control loop in an operation of the amplitude gain setting unit 858 may be set higher than a crossing frequency of an open loop transfer function of a control loop in an operation of the frequency setting unit 859.

By performing the above-described correction processing, the following effects can be obtained.

When the mechanical resonance frequency of the resonator element 446 changes under the influence of disturbances such as an ambient temperature change, a gravity change, a vibration, and noise, the frequency and the amplitude of the vibration of the resonator element 446 change, and the S/N ratio of the second modulation signal decreases. Accordingly, demodulation accuracy of the displacement signal of the moving mirror 33 may decrease.

On the other hand, by performing the above-described correction processing, even when the disturbance such as the temperature change is applied, the frequency and the amplitude of the vibration of the resonator element 446 can be maintained constant. That is, even when the disturbance such as the temperature change is applied, the frequency and the amplitude of the vibration of the resonator element 446 can be corrected so as not to change. Accordingly, it is possible to prevent a decrease in the S/N ratio of the second modulation signal. As a result, even when the disturbance such as the temperature change is applied, it is possible to enhance accuracy of preprocessing and demodulation processing in the calculation device 7, and to prevent the measurement error Δd of the position of the moving mirror 33.

In addition, unlike the driving by the oscillation circuit, even when the disturbance such as the temperature change is applied to change the mechanical resonance frequency, the frequency of the drive signal Sd can be made to follow the change, and thus the resonator element 446 can be continuously driven in the vicinity of the mechanical resonance frequency of the resonator element 446. Accordingly, since driving efficiency of the resonator element 446 is enhanced, it is possible to reduce power consumption of the optical device 1.

7.2. Calculation Device

Next, the calculation device 7 shown in FIG. 19 will be described.

The calculation device 7 shown in FIG. 19 includes the moving mirror position calculation unit 72, the light intensity calculation unit 74, and the Fourier transform unit 76. Further, the moving mirror position calculation unit 72 includes the preprocessing unit 722, the orthogonal signal generation unit 723, the demodulation processing unit 724, and the moving mirror position signal output unit 726.

The orthogonal signal generation unit 723 has a function of generating, based on the reference signal Ss output from the signal generation unit 8 and the signal output from the preprocessing unit 722, a cosine wave signal and a sine wave signal, which are waveforms orthogonal to each other. In the following description, the cosine wave signal and the sine wave signal are also collectively referred to as orthogonal signals. In addition, the generated orthogonal signals are used for the demodulation processing in the demodulation processing unit 724. Further, the cosine wave signal is fed back to the preprocessing unit 722 to adjust a phase of the signal output from the preprocessing unit 722. Accordingly, a decrease in the accuracy of the demodulation processing accompanying a phase shift is prevented, and the measurement error Δd of the position of the moving mirror 33 can be prevented.

The orthogonal signal generation unit 723 may be provided as necessary, and may be omitted. In this case, the reference signal Ss and a signal whose phase is shifted by $\pi/2$ may be used as the orthogonal signals.

8. Third Modification of Third Embodiment

Next, a spectroscopic device according to a third modification of the third embodiment will be described.

Figure 22:
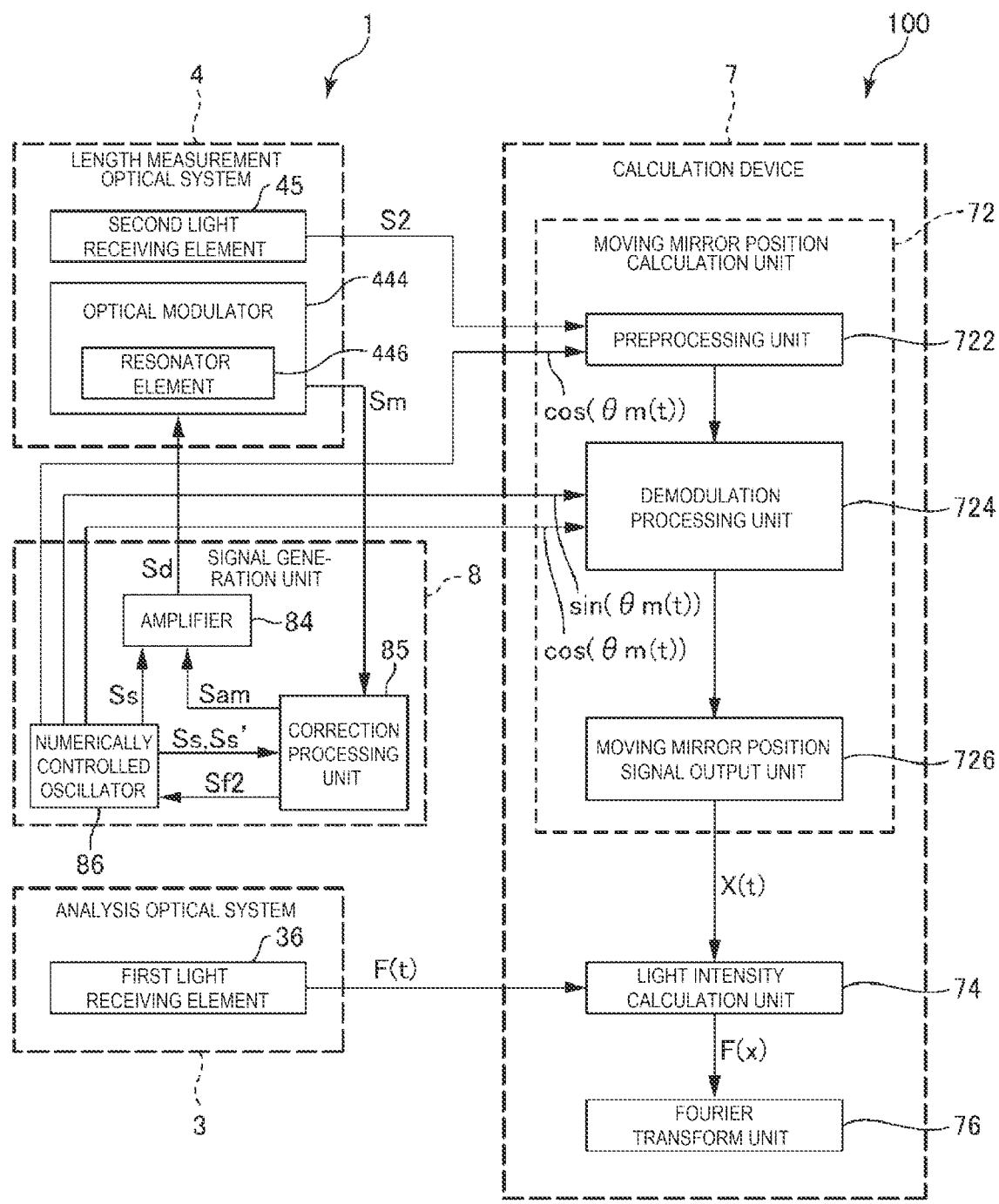
FIG. 22 is a schematic diagram showing main parts of an analysis optical system, a length measurement optical system, a signal generation unit, and a calculation device provided in a spectroscopic device according to a third modification of the third embodiment.
Figure 23:
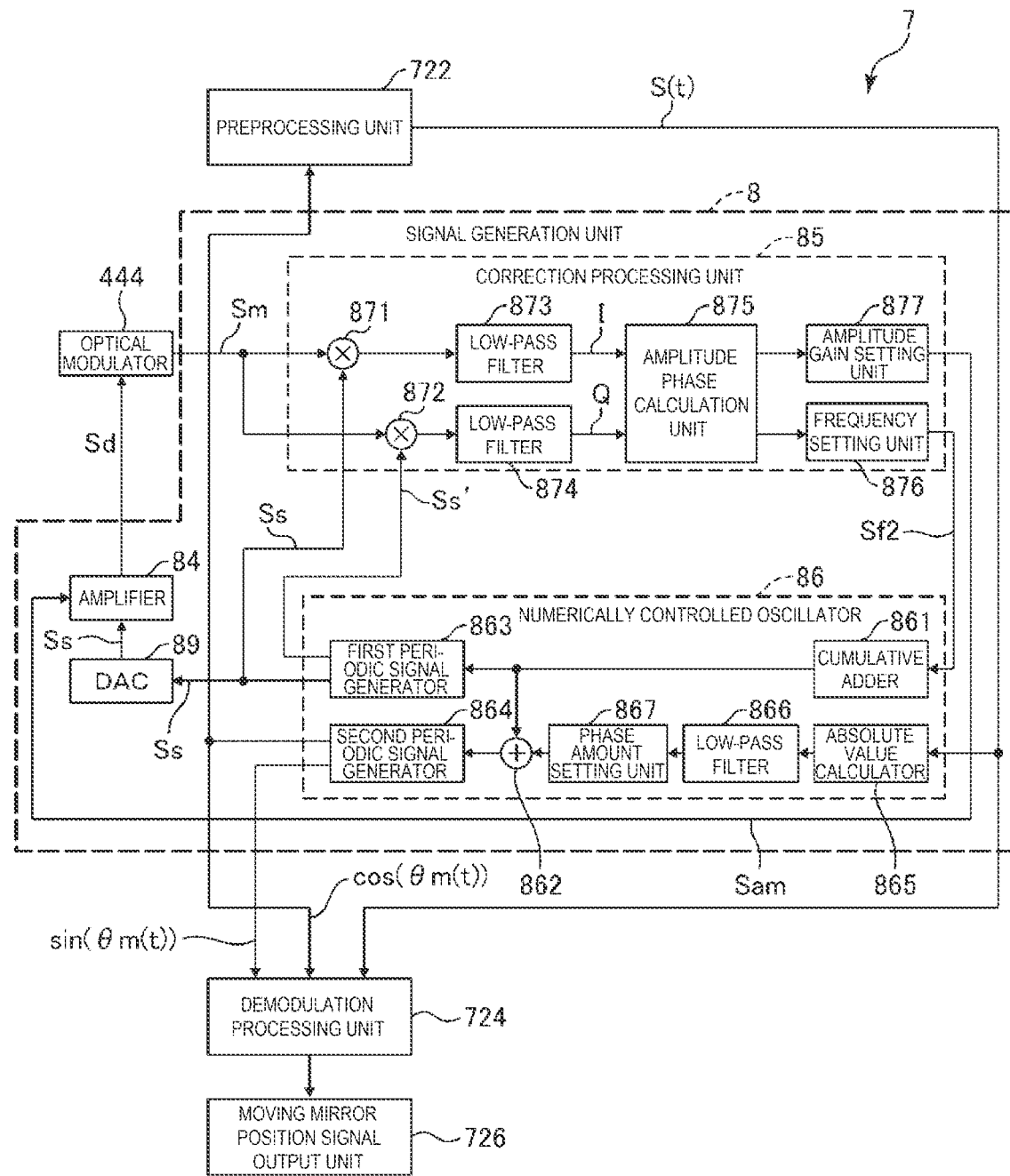
FIG. 23 is a diagram showing details of a signal generation unit in the schematic diagram shown in FIG. 22.

FIG. 22 is a schematic diagram showing main parts of the analysis optical system 3, the length measurement optical system 4, the signal generation unit 8, and the calculation device 7 provided in a spectroscopic device according to the third modification of the third embodiment. FIG. 23 is a diagram showing details of the signal generation unit 8 in the schematic diagram shown in FIG. 22.

The spectroscopic device 100 shown in FIG. 22 is the same as the spectroscopic device 100 shown in FIG. 2 except that a configuration of the signal generation unit 8 is different.

The signal generation unit 8 shown in FIG. 22 includes a numerically controlled oscillator 86, the amplifier 84, and the correction processing unit 85. Among these, as shown in FIG. 23, the correction processing unit 85 includes multipliers 871 and 872, a low-pass filter 873, a low-pass filter 874, an amplitude phase calculation unit 875, a frequency setting unit 876, and an amplitude gain setting unit 877.

8.1. Signal Generation Unit

The signal generation unit 8 shown in FIG. 23 will be described.

The numerically controlled oscillator 86 generates a periodic signal such as a sine wave or a cosine wave by reading data of an address to be added at regular clock intervals from a ROM table containing numerical values of one cycle of a sine wave and a cosine wave. Accordingly, the numerically controlled oscillator 86 generates the reference signal Ss of a target frequency with high accuracy and outputs the reference signal Ss to a DAC 89. The DAC 89 is a digital-analog converter, and generates the analog reference signal Ss based on the input digital reference signal Ss.

The numerically controlled oscillator 86 shown in FIG. 23 includes a cumulative adder 861, an absolute value calculator 865, a low-pass filter 866, a phase amount setting unit 867, an adder 862, a first periodic signal generator 863, and a second periodic signal generator 864.

The cumulative adder 861 cumulatively adds a frequency control signal Sf2 output from the frequency setting unit 876 of the correction processing unit 85. The frequency control signal Sf2 is a phase lead amount per unit time step corresponding to a frequency to be set to the reference signal Ss, which will be described later. The cumulative adder 861 cumulatively adds the phase lead amount to calculate a cumulative addition value. The obtained cumulative addition value is output to the first periodic signal generator 863.

The first periodic signal generator 863 includes a read only memory (ROM) containing numerical values of one cycle of a sine wave and a cosine wave. In the first periodic signal generator 863, a numerical value of an address corresponding to the cumulative addition value is read. Accordingly, a sine wave signal and a cosine wave signal having a frequency corresponding to the frequency control signal Sf2 can be generated. The cosine wave signal is output as the reference signal Ss to the DAC 89 and the multiplier 871 of the correction processing unit 85. The sine wave signal is output as a reference signal Ss' to the multiplier 872 of the correction processing unit 85.

The absolute value calculator 865 calculates an absolute value of a preprocessed signal S(t) output from the preprocessing unit 722. A calculation result is input to the phase amount setting unit 867 through the low-pass filter 866.

As described above, the phase amount setting unit 867 sets a phase amount a to be added to the cumulative addition value by the adder 862. The adder 862 calculates a sum of the cumulative addition value and the phase amount a. The obtained sum of the cumulative addition value and the phase amount a is output toward the second periodic signal generator 864.

The second periodic signal generator 864 reads a numerical value of an address corresponding to the sum of the cumulative addition value and the phase amount a from a read only memory (ROM) containing numerical values of one cycle of a sine wave and a cosine wave. Accordingly, a sine wave signal $\sin(\theta_m(t))$ and a cosine wave signal $\cos(\theta_m(t))$ to which a phase offset of the phase amount a is added can be generated at a frequency corresponding to the frequency control signal Sf2. The cosine wave signal $\cos(\theta_m(t))$ is output to the preprocessing unit 722 and the demodulation processing unit 724 to be described later, and the sine wave signal $\sin(\theta_m(t))$ is output to the demodulation processing unit 724.

Although a configuration example of the numerically controlled oscillator 86 is described above, the configuration of the numerically controlled oscillator 86 is not limited to the above.

8.2. Correction Processing Unit

As shown in FIG. 22, the output signal Sm that is output corresponding to driving of the optical modulator 444 is input to the correction processing unit 85. The correction processing unit 85 obtains, based on quadrature detection, a phase difference between the output signal Sm and the reference signal Ss and an amplitude of the output signal Sm.

The correction processing unit 85 has a function of outputting the frequency control signal Sf2 (correction signal) to the numerically controlled oscillator 86 and a function of outputting the amplification factor control signal Sam (correction signal) to the amplifier 84.

The output signal Sm from the optical modulator 444 is converted into a digital signal and then divided into two, as shown in FIG. 23. Then, one output signal Sm is multiplied by the reference signal Ss in the multiplier 871. The signal output from the multiplier 871 passes through the low-pass filter 873 and is input as a signal I to the amplitude phase calculation unit 875. The other output signal Sm is multiplied by the reference signal Ss' by the multiplier 872. The signal output from the multiplier 872 passes through the low-pass filter 874 and is input as a signal Q to the amplitude phase calculation unit 875.

A transmission frequency band of the low-pass filter 873 and the low-pass filter 874 is preferably a band that can remove frequencies equal to or higher than the frequency of the drive signal Sd.

The amplitude phase calculation unit 875 performs calculation of atan (Q/I) to calculate the phase of the output signal Sm. The amplitude phase calculation unit 875 outputs the phase difference between the output signal Sm and the reference signal Ss toward the frequency setting unit 876. The amplitude phase calculation unit 875 performs calculation of $(I^2+Q^2)^{1/2}$ to calculate the amplitude of the output signal Sm. The amplitude phase calculation unit 875 outputs the calculated amplitude to the amplitude gain setting unit 877. For example, a coordinate rotation digital computer (CORDIC) which is a demodulation circuit is used for the amplitude phase calculation unit 875, and the present disclosure is not limited thereto.

The frequency setting unit 876 has a function of determining the target frequency of the reference signal Ss. Further, the frequency setting unit 876 controls the frequency control signal Sf2 so that the frequency of the reference signal Ss is the target frequency, and outputs the frequency control signal Sf2 to the numerically controlled oscillator 86.

The numerically controlled oscillator 86 generates the reference signal Ss based on the frequency control signal Sf2. Accordingly, the frequency of the reference signal Ss is corrected.

The amplitude gain setting unit 877 has a function of determining the target amplitude of the drive signal Sd. Further, the amplitude gain setting unit 877 controls the amplification factor control signal Sam so that the amplitude of the drive signal Sd is the target amplitude, and outputs the amplification factor control signal Sam to the amplifier 84.

The amplifier 84 amplifies the amplitude of the drive signal Sd based on the amplification factor control signal Sam. Accordingly, the amplitude of the drive signal Sd is corrected.

By performing the above-described correction processing, the following effects can be obtained.

Even when the disturbance such as the temperature change is applied, the frequency and the amplitude of the drive signal Sd can follow changes in the mechanical resonance frequency and a vibration amplitude of the resonator element 446. Accordingly, the frequency and the amplitude of the vibration of the resonator element 446 can be maintained constant. As a result, it is possible to prevent a decrease in the S/N ratio of the second modulation signal. As a result, even when the disturbance is applied, the measurement error Δd of the position of the moving mirror 33 can be prevented.

In addition, unlike the driving by the oscillation circuit, the resonator element 446 can be driven in the vicinity of the mechanical resonance frequency of the resonator element 446, and thus the power consumption of the optical device 1 can be reduced.

In addition, the correction processing unit 85 obtains, based on the quadrature detection, the phase difference between the output signal Sm and the reference signal Ss and an amplitude of the output signal Sm. According to the quadrature detection, the phase difference and the amplitude can be instantaneously obtained. Therefore, the correction processing can be performed in real time.

The numerically controlled oscillator 86 can generate a periodic signal based on a numerical value read from a ROM table. Therefore, the numerically controlled oscillator 86 can output highly accurate reference signals Ss and Ss' and a highly accurate cosine wave signal $\cos(\theta_m(t))$ and a sine wave signal $\sin(\theta_m(t))$ without being affected by noise or the like. Accordingly, it is possible to particularly enhance accuracy of the preprocessing and the demodulation processing in the calculation device 7.

6. Fourth Embodiment

Next, an optical device and a spectroscopic device according to a fourth embodiment will be described.

Figure 24:
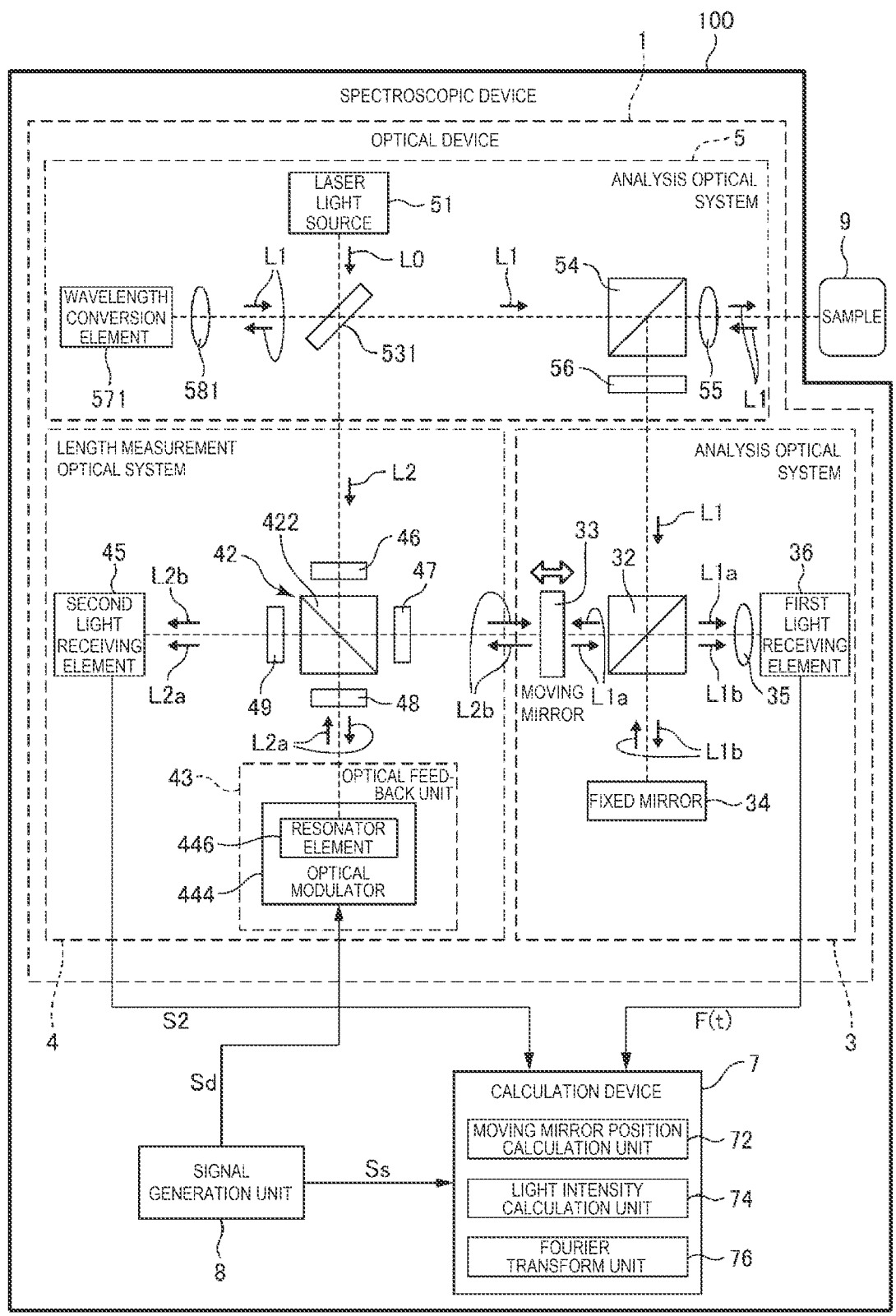
FIG. 24 is a schematic configuration diagram showing a spectroscopic device according to a fourth embodiment.

FIG. 24 is a schematic configuration diagram showing the spectroscopic device 100 according to the fourth embodiment.

Hereinafter, the fourth embodiment will be described. In the following description, differences from the first embodiment will be mainly described, and the description of similar matters will be omitted.

The incident optical system 5 shown in FIG. 24 is the same as the incident optical system 5 shown in FIG. 1 except that the incident optical system 5 further includes a wavelength conversion element 571 and a condensing lens 581.

The emitted light L0 emitted from the laser light source 51 shown in FIG. 24 is divided into the analysis light L1 and the length measurement light L2 by the beam splitter 531. The length measurement light L2 passes through the beam splitter 531 and enters the length measurement optical system 4. The analysis light L1 is reflected by the beam splitter 531, is condensed by the condensing lens 581, and is emitted to the wavelength conversion element 571.

Figure 25:
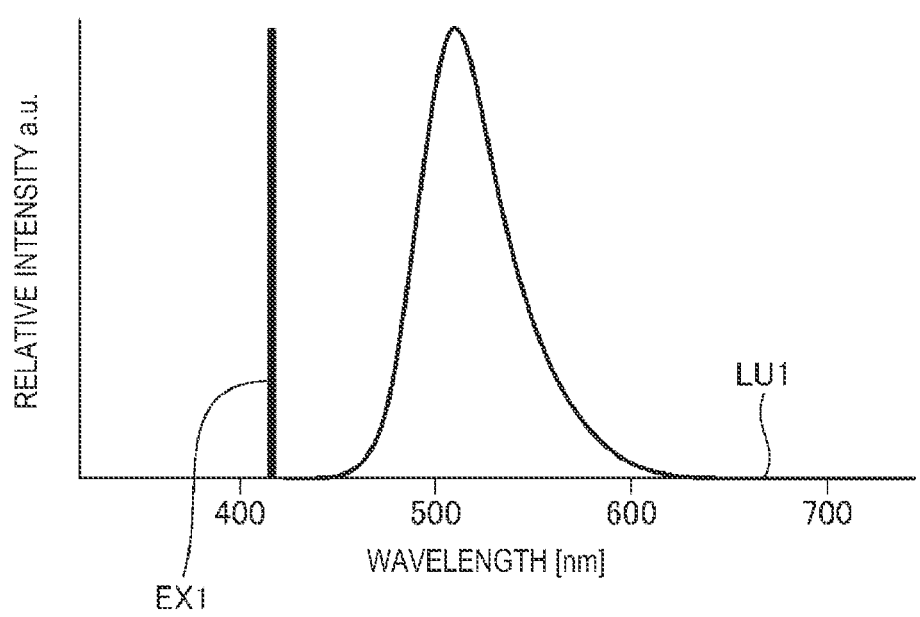
FIG. 25 is an example of an excitation spectrum EX1 and an emission spectrum LU1 when a phosphor is excited by light having a wavelength of 405 nm and emits fluorescence having a wavelength of 450 nm to 650 nm.

The wavelength conversion element 571 is not particularly limited as long as it is an element that converts a wavelength of excitation light and emits light. For example, a phosphor can be used. FIG. 25 is an example of the excitation spectrum EX1 and the emission spectrum LU1 when a phosphor is excited by light having a wavelength of 405 nm and emits fluorescence having a wavelength of 450 to 650 nm. The fluorescence from the wavelength conversion element 571 is emitted as the analysis light L1 having a wavelength different from that at the time of incidence, and is emitted to the sample 9 through the condensing lens 581, the beam splitters 531 and 54, and the condensing lens 55. Accordingly, even when the laser light source 51 is used, wide band light, so-called white light, can be obtained by the analysis light L1 being emitted to the sample 9. Therefore, the spectroscopic device 100 shown in FIG. 24 can be applied to, for example, reflection absorption spectroscopy, and fluorescence spectroscopy, spectroscopy for the sample 9.

In the fourth embodiment described above, effects same as those of the first embodiment can also be obtained.

7. First Modification of Fourth Embodiment

Next, an optical device and a spectroscopic device according to a first modification of the fourth embodiment will be described.

Figure 26:
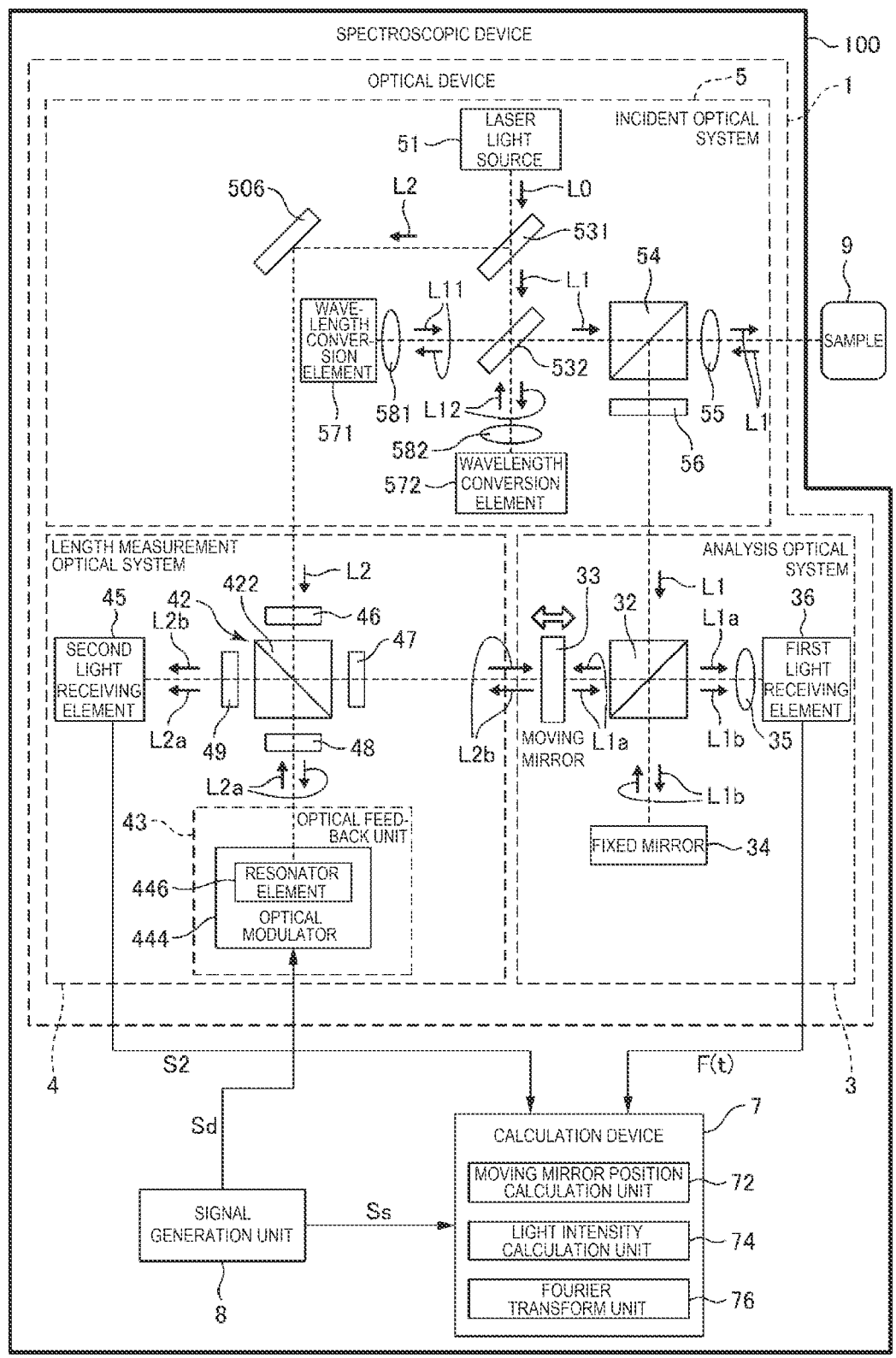
FIG. 26 is a schematic configuration diagram showing a spectroscopic device according to a first modification of the fourth embodiment.

FIG. 26 is a schematic configuration diagram showing the spectroscopic device 100 according to the first modification of the fourth embodiment.

The incident optical system 5 shown in FIG. 26 is the same as the incident optical system 5 shown in FIG. 24 except that the incident optical system 5 further includes a beam splitter 532, a wavelength conversion element 572, a condensing lens 582, and a mirror 506.

The emitted light L0 emitted from the laser light source 51 shown in FIG. 26 is divided into the analysis light L1 and the length measurement light L2 by the beam splitter 531 (incident light dividing element). The length measurement light L2 is reflected by the beam splitter 531 and enters the length measurement optical system 4 through the mirror 506. The analysis light L1 passes through the beam splitter 531 and then enters the beam splitter 532. In the beam splitter 532, the analysis light L1 is divided into two. One analysis light L11 is emitted to the wavelength conversion element 571 through the condensing lens 581, and the other analysis light L12 is emitted to the wavelength conversion element 572 through the condensing lens 582.

Figure 27:
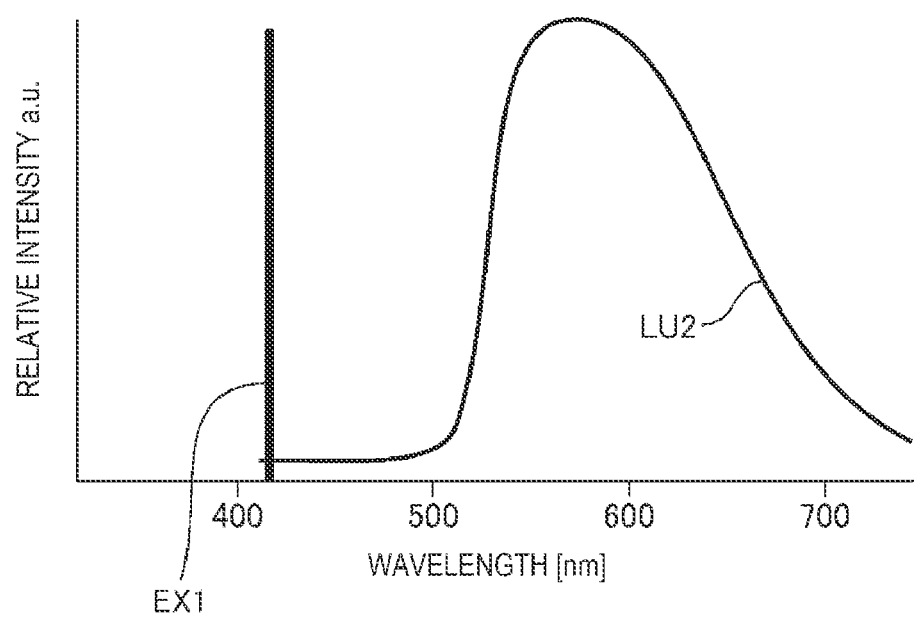
FIG. 27 is an example of the excitation spectrum EX1 and an emission spectrum LU2 when a phosphor is excited by light having a wavelength of 405 nm and emits fluorescence having a wavelength of 500 nm to 700 nm.

For example, a phosphor is used for the wavelength conversion element 572 as well. FIG. 27 is an example of the excitation spectrum EX1 and the emission spectrum LU2 when the phosphor is excited by light having a wavelength of 405 nm and emits fluorescence having a wavelength of more than 500 to 700 nm. The wavelength conversion element 571 and the wavelength conversion element 572 described above have different fluorescence wavelength ranges. Therefore, when the analysis light L11 which is the fluorescence from the wavelength conversion element 571 and the analysis light L12 which is the fluorescence from the wavelength conversion element 572 are synthesized by the beam splitter 532, the analysis light L1 having a wider band than that of the fourth embodiment is obtained. At this time, the beam splitter 532 functions as a light synthesizing unit.

The wavelength conversion element 572 may be replaced with a reflective element that reflects the wavelength without conversion as necessary. The reflective element may be an element that causes specular reflection or an element that causes scattering.

8. Second Modification of Fourth Embodiment

Next, an optical device and a spectroscopic device according to a second modification of the fourth embodiment will be described.

Figure 28:
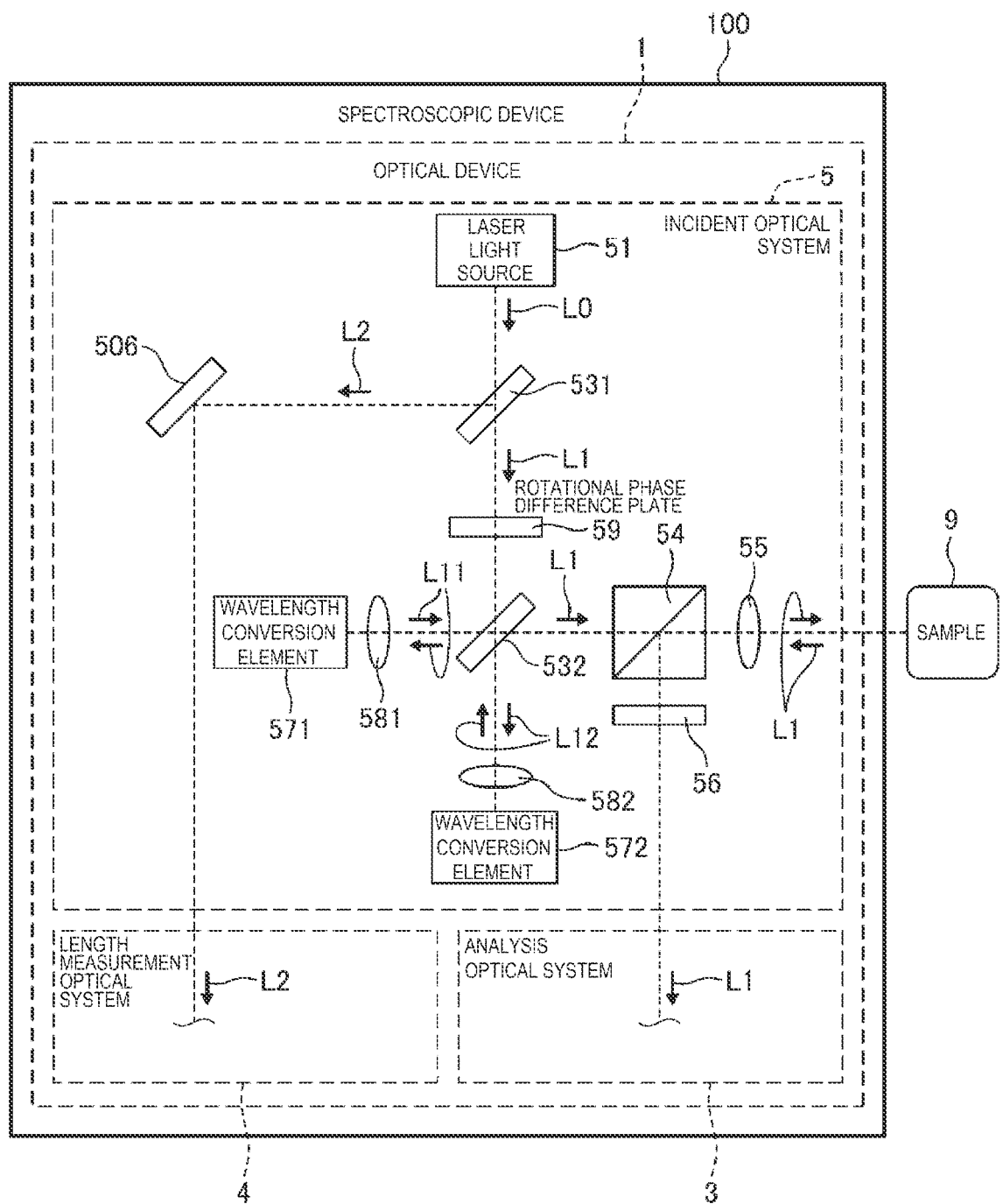
FIG. 28 is a schematic configuration diagram showing a spectroscopic device according to a second modification of the fourth embodiment.

FIG. 28 is a schematic configuration diagram showing the spectroscopic device 100 according to the second modification of the fourth embodiment.

The incident optical system 5 shown in FIG. 28 is the same as the incident optical system 5 shown in FIG. 26 except that the incident optical system 5 further includes a rotational phase difference plate 59 and that the beam splitter 532 is a polarizing beam splitter. The rotational phase difference plate 59 is disposed between the beam splitter 531 and the beam splitter 532. The rotational phase difference plate 59 is a ½ wavelength plate through which the analysis light L1 passes, and rotates about an axis parallel to an optical path of the analysis light L1 as a rotation axis. When the rotational phase difference plate 59 rotates, a mixing ratio of P-polarized light and S-polarized light (polarization ratio) included in the analysis light L1 transmitted through the rotational phase difference plate 59 changes. Accordingly, when the analysis light L1 is divided into the analysis light L11 and the analysis light L12 by the beam splitter 532 which is a polarizing beam splitter, a division ratio can be freely changed. As a result, when the analysis light L11 and the analysis light L12 are synthesized by the beam splitter 532 to obtain the analysis light L1, a synthesis ratio can be freely changed.

Figure 29:
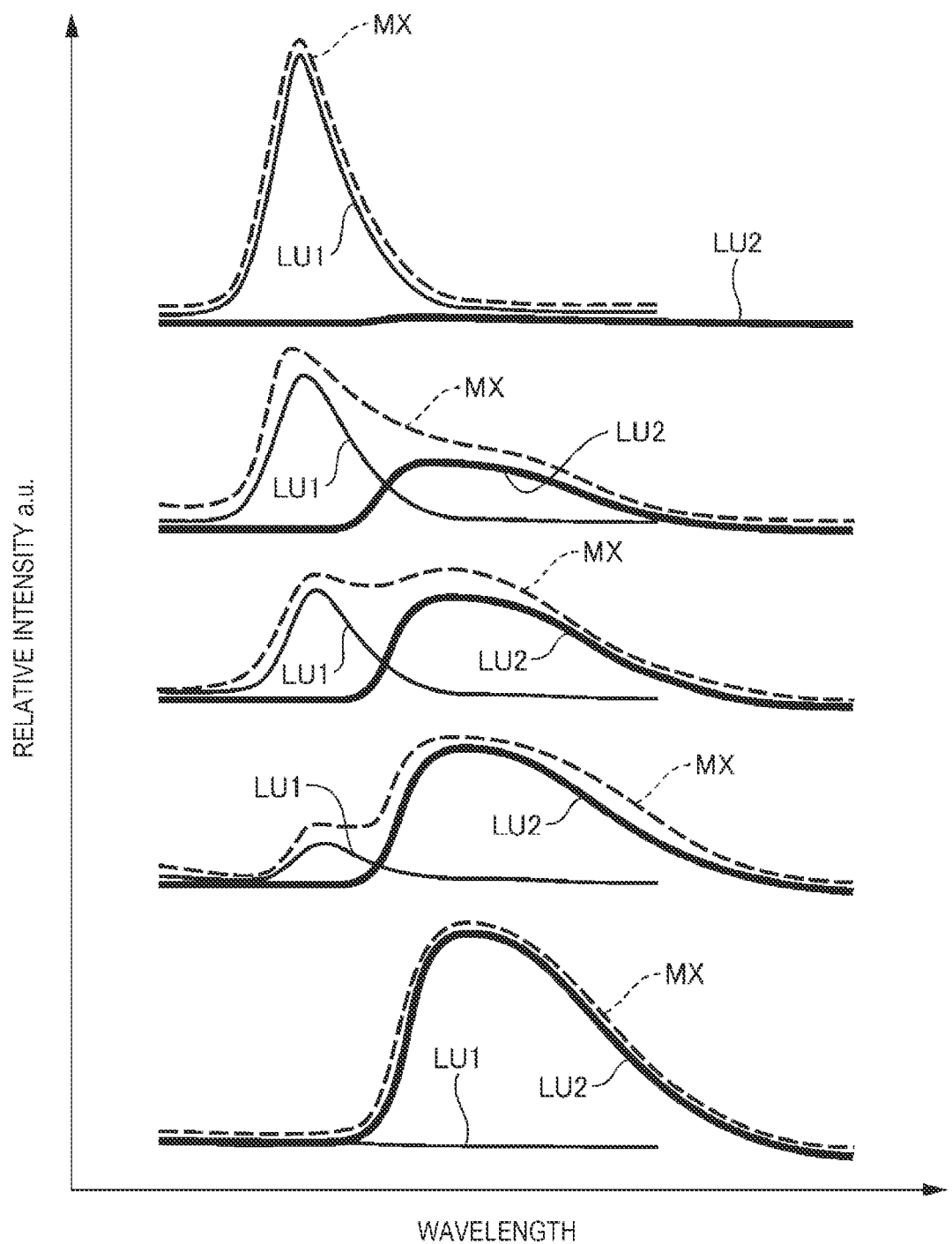
FIG. 29 is a diagram comparing examples of changes in a synthesized emission spectrum MX when synthesizing the fluorescence of the emission spectrum LU1 shown in FIG. 25 and the fluorescence of the emission spectrum LU2 shown in FIG. 27 while changing a synthesis ratio in five stages.

FIG. 29 is a diagram comparing examples of changes in the synthesized emission spectrum MX when synthesizing the fluorescence of the emission spectrum LU1 shown in FIG. 25 and the fluorescence of the emission spectrum LU2 shown in FIG. 27 while changing the synthesis ratio in five stages. In the synthesized emission spectrum MX at the top of FIG. 29, an intensity of the emission spectrum LU2 is substantially zero. At this time, a polarization axis of the rotational phase difference plate 59 is substantially parallel to the S-polarized light. On the other hand, in the synthesized emission spectrum MX at the bottom of FIG. 29, the intensity of the emission spectrum LU1 is substantially zero. At this time, the polarization axis of the rotational phase difference plate 59 is substantially parallel to the P-polarized light. Further, in the synthesized emission spectrum MX located between these, a ratio between the intensity of the emission spectrum LU1 and the intensity of the emission spectrum LU2 gradually changes. At this time, the polarization axis of the rotational phase difference plate 59 is inclined with respect to both the P-polarized light and the S-polarized light, and rotation angles of the rotational phase difference plate 59 are different from each other.

In this way, by providing the rotational phase difference plate 59, it is possible to obtain the analysis light L1 having any synthesized emission spectrum MX. Accordingly, the optimal analysis light L1 can be created according to physical properties of the sample 9, a purpose of analysis, and the like.

9. Third Modification of Fourth Embodiment

Next, an optical device and a spectroscopic device according to a third modification of the fourth embodiment will be described.

Figure 30:
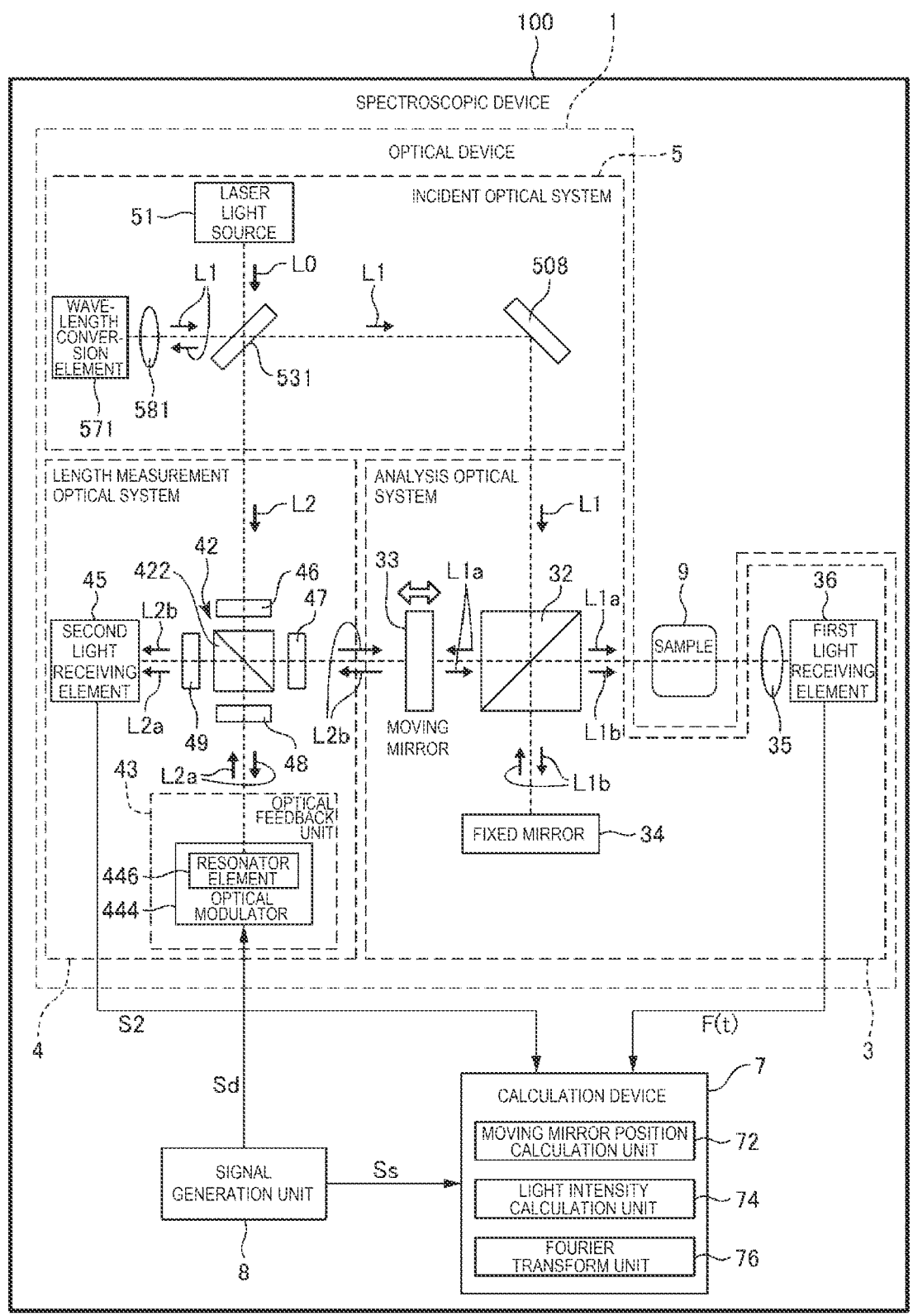
FIG. 30 is a schematic configuration diagram showing a spectroscopic device according to a third modification of the fourth embodiment.

FIG. 30 is a schematic configuration diagram showing the spectroscopic device 100 according to the third modification of the fourth embodiment.

The optical device 1 shown in FIG. 30 is the same as the optical device 1 shown in FIG. 24 except that the optical device 1 is implemented to irradiate the sample 9 with the analysis light L1 in the analysis optical system 3 instead of inside the incident optical system 5.

The incident optical system 5 shown in FIG. 30 includes a mirror 508 in place of the beam splitter 54, the condensing lens 55, and the neutral density filter 56. In the analysis optical system 3 shown in FIG. 30, the sample 9 is disposed between the beam splitter 32 and the condensing lens 35. According to such a configuration, the sample 9 is irradiated with the analysis light L1, and the light emitted from a side opposite from an irradiation surface can be received by the first light receiving element 36. As a result, spectroscopy by a transmission method is possible. By appropriately selecting the wavelength conversion element 571 shown in FIG. 30, the spectroscopic device 100 shown in FIG. 30 can be applied to various types of spectroscopy such as Fourier infrared spectroscopy (FT-IR), Fourier type near-infrared spectroscopy (FT-NIR), Fourier visible spectroscopy (FT-VIS), Fourier ultraviolet spectroscopy (FT-UV) and Fourier terahertz spectroscopy (FT-THz).

The position of the sample 9 is not limited to the position shown in FIG. 30, and may be, for example, between the mirror 508 and the beam splitter 32.

10. Fourth Modification of Fourth Embodiment

Next, an optical device and a spectroscopic device according to a fourth modification of the fourth embodiment will be described.

Figure 31:
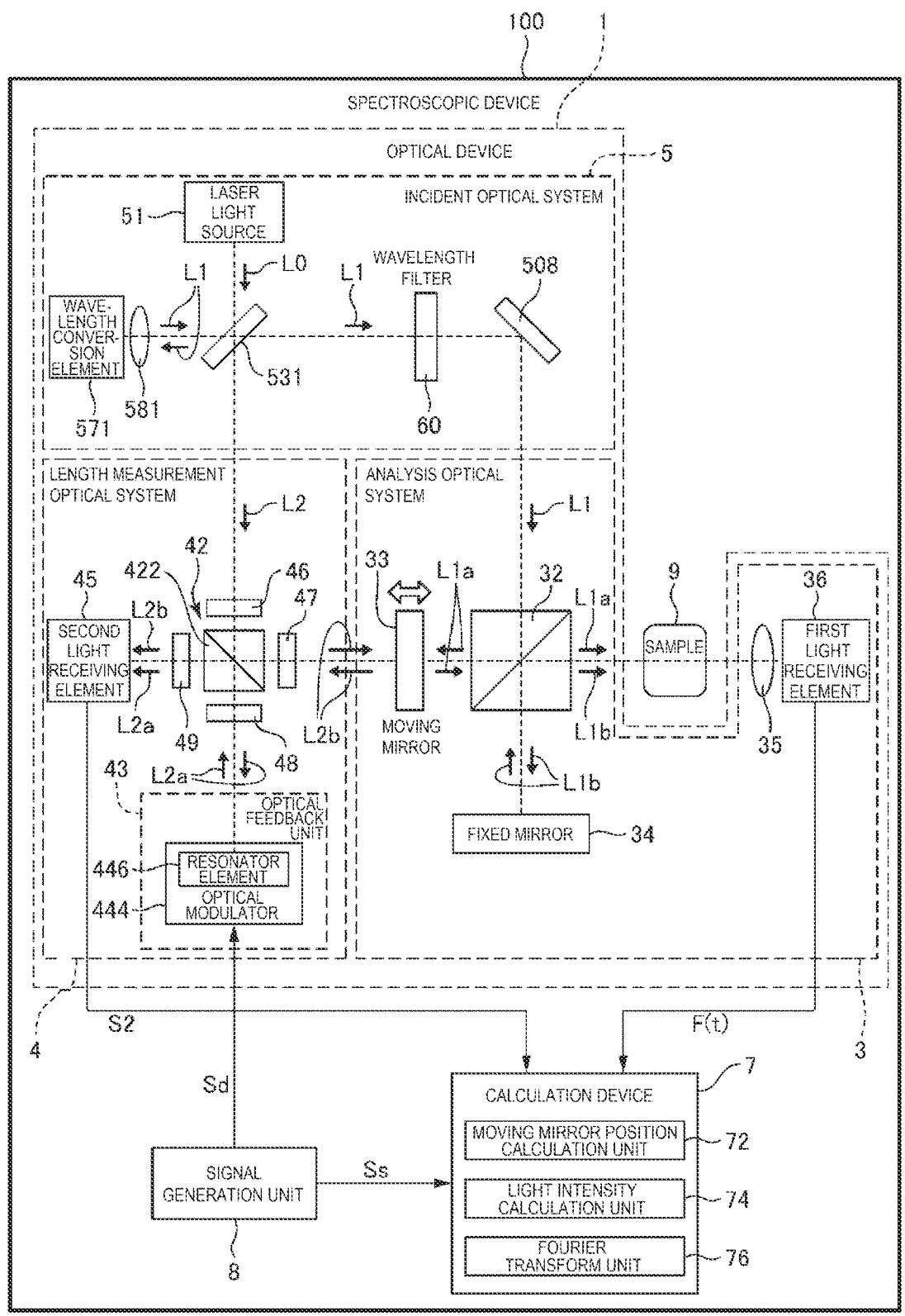
FIG. 31 is a schematic configuration diagram showing a spectroscopic device according to a fourth modification of the fourth embodiment.

FIG. 31 is a schematic configuration diagram showing the spectroscopic device 100 according to the fourth modification of the fourth embodiment.

The incident optical system 5 shown in FIG. 31 is the same as the optical device 1 shown in FIG. 30 except that the incident optical system 5 further includes a wavelength filter 60.

Figure 32:
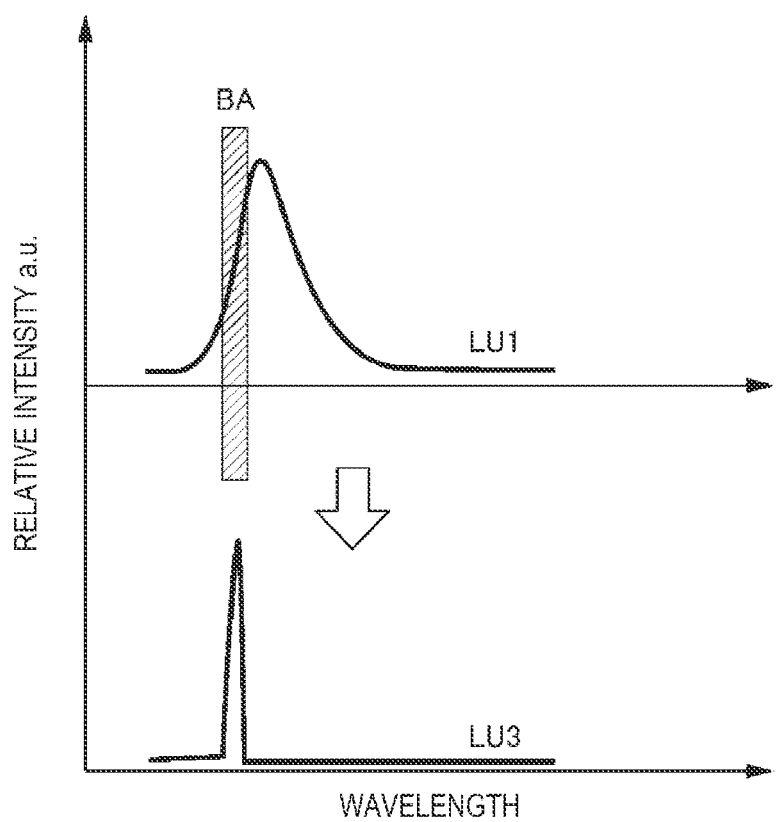
FIG. 32 is a diagram showing a state in which the emission spectrum LU1 shown in FIG. 25 overlaps with a transmission wavelength band BA of a wavelength filter, and a spectrum LU3 of analysis light transmitted through the wavelength filter.

The wavelength filter 60 shown in FIG. 31 has, for example, a bandpass characteristic that overlaps the emission spectrum LU1 shown in FIG. 25 and is sufficiently narrower than a band thereof. A transmission wavelength bandwidth is, for example, 10 nm or less. FIG. 32 is a diagram showing a state in which the emission spectrum LU1 shown in FIG. 25 overlaps with a transmission wavelength band BA of the wavelength filter 60, and a spectrum LU3 of the analysis light L1 transmitted through the wavelength filter 60. As shown in FIG. 32, light in a target wavelength range (spectrum LU3) can be selectively transmitted from the fluorescence having the emission spectrum LU1. As a result, the optimal analysis light L1 can be created according to physical properties of the sample 9, a purpose of analysis, and the like.

The optical device 1 shown in FIG. 31 may include a plurality of wavelength filters 60 having different bandpass characteristics. Further, the wavelength filter 60 overlapping the optical path of the analysis light L1 may be switched. Accordingly, the bandpass characteristics can be switched by a simple operation.

11. Fifth Modification of Fourth Embodiment

Next, an optical device and a spectroscopic device according to a fifth modification of the fourth embodiment will be described.

Figure 33:
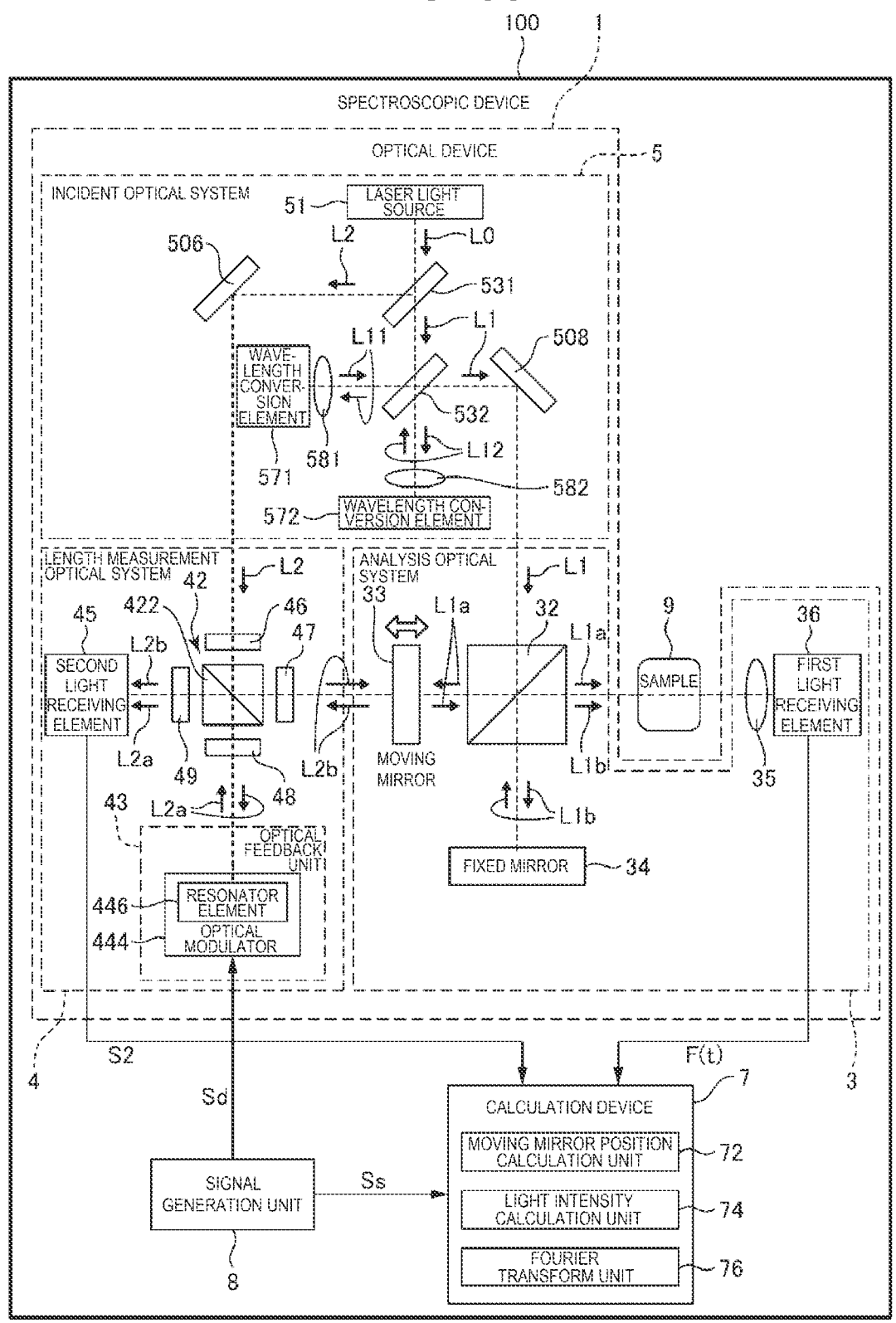
FIG. 33 is a schematic configuration diagram showing a spectroscopic device according to a fifth modification of the fourth embodiment.

FIG. 33 is a schematic configuration diagram showing the spectroscopic device 100 according to the fifth modification of the fourth embodiment.

The optical device 1 shown in FIG. 33 is the same as the optical device 1 shown in FIG. 26 except that the optical device 1 is implemented to irradiate the sample 9 with the analysis light L1 in the analysis optical system 3 instead of inside the incident optical system 5.

The incident optical system 5 shown in FIG. 33 includes the mirror 508 instead of the beam splitter 54, the condensing lens 55, and the neutral density filter 56. In the analysis optical system 3 shown in FIG. 33, the sample 9 is disposed between the beam splitter 32 and the condensing lens 35. According to such a configuration, the sample 9 is irradiated with the analysis light L1, and the light emitted from a side opposite from an irradiation surface can be received by the first light receiving element 36. As a result, spectroscopy by a transmission method is possible. Further, by appropriately selecting the wavelength conversion elements 571 and 572 shown in FIG. 33, the spectroscopic device 100 shown in FIG. 33 can be applied to various types of spectroscopy such as FT-IR, FT-NIR, FT-VIS, FT-UV, and FT-THz.

The position of the sample 9 is not limited to the position shown in FIG. 33, and may be, for example, between the mirror 508 and the beam splitter 32.

12. Effects of Embodiments

As described above, the optical device 1 according to the embodiments includes the incident optical system 5, the analysis optical system 3, and the length measurement optical system 4.

The incident optical system 5 includes the laser light source 51 and the incident light dividing element. The laser light source 51 emits the emitted light L0 (laser light). The incident light dividing element divides the emitted light L0 into the analysis light L1 (first divided light) and the length measurement light L2 (second divided light).

The analysis optical system 3 includes the beam splitter 32 (first light dividing element), the moving mirror 33 (first mirror), the fixed mirror 34 (second mirror), and the first light receiving element 36. After dividing the analysis light L1 into one (analysis light L1$a$) and the other (analysis light L1$b$), the beam splitter 32 mixes the analysis light L1$a$ (one first divided light) and the analysis light L1$b$ (the other first divided light). The moving mirror 33 moves in an incident direction of the analysis light L1$a$ and adds a first modulation signal to the analysis light L1$a$ by reflecting the analysis light L1$a$. The fixed mirror 34 reflects the analysis light L1$b$. The first light receiving element 36 receives a sample-derived signal generated by an action of the analysis light L1a and the sample 9 and the analysis light L1a and L1b including the first modulation signal, and outputs the first light receiving signal F(t).

The length measurement optical system 4 includes the second light dividing element 42, the optical feedback unit 43, and the second light receiving element 45. After dividing the length measurement light L2 into one (length measurement light L2a) and the other (length measurement light L2b), the second light dividing element 42 mixes the length measurement light L2a (one second divided light) and the length measurement light L2b (the other second divided light). The optical feedback unit 43 feeds back the length measurement light L2a emitted from the second light dividing element 42 to the second light dividing element 42. The second light receiving element 45 receives the length measurement light L2a and L2b including a displacement signal generated by the length measurement t light L2b reflected by the moving mirror 33, and outputs the second light receiving signal S2.

According to such a configuration, the emitted light L0 emitted from one laser light source 51 can be used for optical interference in the analysis optical system 3 and the length measurement optical system 4. Therefore, it is not necessary to use two light sources, and space saving, low power consumption, and structure simplification of the optical system can be achieved. Therefore, according to the optical device 1 described above, it is possible to implement the spectroscopic device 100 which is small in size and consumes little power.

The optical feedback unit 43 may include the light reflector 442 that reflects the length measurement light L2a (one second divided light) toward the second light dividing element 42.

According to such a configuration, the configuration of the optical feedback unit 43 can be simplified, and the size of the optical device 1 can be reduced.

The optical feedback unit 43 may include the optical modulator 444 that is driven by the drive signal Sd and adds the second modulation signal to the length measurement light L2a (one second divided light).

According to such a configuration, when the length measurement light L2a and L2b is caused to interfere with each other, phase information corresponding to the position of the moving mirror 33 can be obtained with higher accuracy by optical heterodyne interferometry. The position of the moving mirror 33 is determined with high accuracy based on the phase information in the calculation device 7. As a result, the interferogram F(x) can be generated at finer intervals, and the spectroscopic device 100 capable of obtaining a spectral pattern with a high resolution can be finally implemented.

The optical modulator 444 may include the resonator element 446 that vibrates in response to the drive signal Sd. The optical modulator 444 adds the second modulation signal to the length measurement light L2a (one of the second divided light) by reflecting the length measurement light L2a (one of the second divided light) by the resonator element 446 that vibrates.

According to such a configuration, a volume and a weight of the optical modulator 444 can be significantly reduced as compared with an optical modulator having an AOM or an EOM. Therefore, it is possible to reduce a size, a weight, and power consumption of the optical device 1.

In addition, the resonator element 446 may be a quartz crystal resonator, a silicon resonator, or a ceramic resonator.

Unlike other resonators such as piezo elements, these resonators are resonators that utilize a mechanical resonance phenomenon, and therefore have a high Q value and can easily stabilize a natural frequency. Therefore, the S/N ratio of the second modulation signal can be enhanced.

The optical device 1 may include the wavelength conversion element 571 that converts a wavelength of the analysis light L11 (first divided light).

According to such a configuration, wide band light, so-called white light, can be obtained with the analysis light L1 emitted to the sample 9. Accordingly, the spectroscopic device 100 applicable to, for example, reflection spectroscopy, absorption spectroscopy, and fluorescence spectroscopy for the sample 9 can be implemented.

The optical device 1 may include the beam splitter 532 as a light synthesizing unit. After dividing the analysis light L1 (first divided light) into one and the other, the beam splitter 532 synthesizes the analysis light L11 (one first divided light) whose wavelength is converted by the wavelength conversion element 571 and the analysis light L12 (the other first divided light).

According to such a configuration, wider band light can be obtained with the analysis light L1 emitted to the sample 9.

The optical device 1 may include the rotational phase difference plate 59. The rotational phase difference plate 59 can change a polarization ratio of the analysis light L1 (first divided light) to be transmitted by rotation. Accordingly, when the analysis light L11 and the analysis light L12 are synthesized by the beam splitter 532 that functions as the light synthesizing unit, a synthesis ratio can be freely changed.

The laser light source 51 is preferably a semiconductor laser element.

Accordingly, it is possible to reduce a size and a weight of the optical device 1 and the spectroscopic device 100.

The spectroscopic device 100 according to the embodiments includes the optical device 1 according to the embodiments, the signal generation unit 8, the moving mirror position calculation 72, the unit light intensity calculation unit 74, and the Fourier transform unit 76.

The signal generation unit 8 outputs the reference signal Ss. The moving mirror position calculation unit 72 generates, based on the reference signal Ss, the moving mirror position signal X(t) indicating the position of the moving mirror 33 (first mirror) by performing calculation on the second light receiving signal S2. The light intensity calculation unit 74 generates, based on the first light receiving signal F(t) and the moving mirror position signal X(t), a waveform (interferogram F(x)) representing the intensity of the first light receiving signal F(t) at each position of the moving mirror 33. The Fourier transform unit 76 performs Fourier transform on the interferogram F(x) to obtain a spectral pattern (spectrum information).

In the above-described optical device 1, the emitted light L0 emitted from one laser light source 51 can be used for optical interference in the analysis optical system 3 and the length measurement optical system 4. Therefore, it is not necessary to use two light sources, and space saving, low power consumption, and structure simplification of the optical system can be achieved. Accordingly, the spectroscopic device 100 which is small in size and consumes little power is obtained.

The optical feedback unit 43 may include the optical modulator 444 that adds the second modulation signal to the length measurement light L2a (one second divided light). The optical modulator 444 may include the resonator element 446 that vibrates in response to the drive signal Sd, and may be implemented to add the second modulation signal to the length measurement light L2a by reflecting the length measurement light L2a by the resonator element 446 that vibrates. Further, the signal generation unit 8 may include the oscillation circuit 81 that operates using the resonator element 446 as a signal source, and may be implemented to output the reference signal Ss and the drive signal Sd.

According to such a configuration, when the second light receiving signal S2 including the second modulation signal and the reference signal Ss are subjected to calculation in the calculation device 7, the influence of disturbances contained in both signals can be canceled out or reduced in the process of calculation. As a result, the calculation device 7 can determine the position of the moving mirror 33 with higher accuracy even when subjected to the disturbance. In addition, it is possible to reduce the size, the weight, and the power consumption of the spectroscopic device 100.

As described above, the optical device and spectroscopic device according to the present disclosure are described based on the illustrated embodiments, the optical device and spectroscopic device according to the present disclosure are not limited to the embodiments and modifications thereof. The configuration of each unit may be replaced with any configuration having similar functions, or any other configuration may be added.

The optical device and spectroscopic device according to the present disclosure may be a combination of two or more of the embodiments and modifications thereof. Further, each functional unit provided in the spectroscopic device according to the present disclosure may be divided into a plurality of elements, or a plurality of functional units may be integrated into one.

Although a Michelson interference optical system is used in the above embodiments and modifications thereof, other types of interference optical systems may be used.

Further, the arrangement of the sample is not limited to the arrangement shown. Since the sample-derived signal is generated by applying analysis light to the sample, the sample may be disposed at any position as long as the analysis light emitted from the sample is incident on the first light receiving element.

What is claimed is:

1. An optical device comprising:
    an incident optical system;
    an analysis optical system; and
    a length measurement optical system, wherein
    the incident optical system includes
        a laser light source that emits laser light, and
        an incident light dividing element that divides the laser light into first divided light and second divided light,
    the analysis optical system includes
        a first light dividing element that divides the first divided light into one and the other and then mixes the one first divided light and the other first divided light,
        a first mirror that adds a first modulation signal to the one first divided light by moving in an incident direction of the one first divided light and reflecting the one first divided light,
        a second mirror that reflects the other first divided light, and
        a first light receiving element that receives the first divided light including the first modulation signal and a sample-derived signal generated by a sample, and outputs a first light receiving signal, and
    the length measurement optical system includes
        a second light dividing element that divides the second divided light into one and the other and then mixes the one second divided light and the other second divided light,
        an optical feedback unit that feeds back the one second divided light emitted from the second light dividing element to the second light dividing element, and
        a second light receiving element that receives the second divided light including a displacement signal generated by reflection of the other second divided light by the first mirror and outputs a second light receiving signal.

2. The optical device according to claim 1, wherein the optical feedback unit includes a light reflector that reflects the one second divided light toward the second light dividing element.

3. The optical device according to claim 1, wherein the optical feedback unit includes an optical modulator that is driven by a drive signal and adds a second modulation signal to the one second divided light.

4. The optical device according to claim 3, wherein the optical modulator includes a resonator element that vibrates in response to the drive signal, and adds the second modulation signal to the one second divided light by reflecting the one second divided light by the resonator element that vibrates.

5. The optical device according to claim 4, wherein the resonator element is a quartz crystal resonator, a silicon resonator, or a ceramic resonator.

6. The optical device according to claim 1, further comprising:
    a wavelength conversion element configured to convert a wavelength of the first divided light.

7. The optical device according to claim 6, further comprising:
    a light synthesizing unit configured to synthesize, after the first divided light is divided into one and the other, the one first divided light whose wavelength is converted by the wavelength conversion element and the other first divided light.

8. The optical device according to claim 7, further comprising:
    a rotational phase difference plate configured to change a polarization ratio of the first divided light by rotation.

9. The optical device according to claim 1, wherein the laser light source is a semiconductor laser element.

10. A spectroscopic device comprising:
    the optical device according to claim 1;
    a signal generation unit configured to output a reference signal;
    a moving mirror position calculation unit configured to generate, based on the reference signal, a moving mirror position signal indicating a position of the first mirror by performing calculation on the second light receiving signal;
    a light intensity calculation unit configured to generate, based on the first light receiving signal and the moving mirror position signal, a waveform indicating an intensity of the first light receiving signal at each position of the first mirror; and
    a Fourier transform unit configured to perform Fourier transform on the waveform to obtain spectrum information.

11. The spectroscopic device according to claim 10, wherein
- the optical feedback unit includes an optical modulator that adds a second modulation signal to the one second divided light,
- the optical modulator includes a resonator element that vibrates in response to a drive signal, and is configured to add the second modulation signal to the one second divided light by reflecting the one second divided light by the resonator element that vibrates, and
- the signal generation unit includes an oscillation circuit that operates using the resonator element as a signal source, and outputs the reference signal and the drive signal.

* * * * *